US007962517B2

(12) United States Patent
Tritt et al.

(10) Patent No.: US 7,962,517 B2
(45) Date of Patent: Jun. 14, 2011

(54) SIMULTANEOUS REAL-TIME ACCESS TO FINANCIAL INFORMATION

(75) Inventors: Robert L. Tritt, Kansas City, MO (US); Kyle M. Mallot, Lee's Summit, MO (US); Todd P. Glasgow, Kansas City, MO (US); Bradley C. Glascock, Blue Springs, MO (US); Scott A. Hawkins, Olathe, KS (US)

(73) Assignee: DST Systems, Inc., Kansas City, MO (US)

( * ) Notice: Subject to any disclaimer, the term of this patent is extended or adjusted under 35 U.S.C. 154(b) by 0 days.

(21) Appl. No.: 12/658,142

(22) Filed: Feb. 2, 2010

(65) Prior Publication Data
US 2011/0047057 A1 Feb. 24, 2011

Related U.S. Application Data

(60) Division of application No. 11/821,872, filed on Jun. 26, 2007, now Pat. No. 7,686,208, which is a continuation of application No. 09/475,637, filed on Dec. 30, 1999, now Pat. No. 7,275,046.

(51) Int. Cl.
*G06F 17/30* (2006.01)

(52) U.S. Cl. ......... 707/784; 707/950; 705/36 R; 705/40

(58) Field of Classification Search ............ 705/35, 705/36 R, 37, 38, 39, 40; 707/781, 783, 707/784, 950, 999.001, 999.009, 999.01, 707/999.1
See application file for complete search history.

(56) References Cited

U.S. PATENT DOCUMENTS

| | | | |
|---|---|---|---|
| 3,017,103 A | 1/1962 | Goldberg et al. | |
| 4,321,672 A * | 3/1982 | Braun et al. | 705/42 |
| 4,575,621 A | 3/1986 | Dreifus | |
| 4,727,243 A | 2/1988 | Savar | |
| 4,851,999 A | 7/1989 | Moriyama | |
| 4,860,352 A | 8/1989 | Laurance et al. | |
| 4,953,085 A | 8/1990 | Atkins | |
| 5,323,315 A | 6/1994 | Highbloom | |
| 5,675,746 A | 10/1997 | Marshall | |
| 5,679,940 A | 10/1997 | Templeton et al. | |
| 5,701,423 A | 12/1997 | Crozier | |
| 5,708,828 A | 1/1998 | Coleman | |
| 5,710,889 A | 1/1998 | Clark et al. | |
| 5,764,789 A | 6/1998 | Pare, Jr. et al. | |
| 5,787,403 A | 7/1998 | Randle | |
| 5,794,234 A | 8/1998 | Church et al. | |

(Continued)

*Primary Examiner* — Andrew Joseph Rudy
(74) *Attorney, Agent, or Firm* — Lempia Summerfield Katz LLC

(57) ABSTRACT

The present invention is defined by the following claims, and nothing in this section should be taken as a limitation on those claims. By way of introduction, the preferred embodiments describe below include a method of simultaneously presenting user specific real-time financial information includes authenticating a user, for example by using a user-id and password. Then receiving an input from the user indicating the shareholder of interest. The user is then presented with a list of the shareholder's account information. The shareholder account information can be retrieved from several different record keeping systems. The record keeping systems can be maintained by different entities and can store the respective account information in different formats. The shareholder account information can be retrieved by broadcasting an account inquiry to the record keeping systems or by using a cross-reference table that indicates which record keeping systems the shareholder has accounts with. A combination of the broadcast and cross-reference table can be used. Once the shareholder account information is presented, the user can select an account, for example by a hyperlink tag, and receive detailed information about that account.

23 Claims, 30 Drawing Sheets

U.S. PATENT DOCUMENTS

| | | | |
|---|---|---|---|
| 5,802,518 A | 9/1998 | Karaev et al. | |
| 5,852,812 A | 12/1998 | Reeder | |
| 5,864,828 A | 1/1999 | Atkins | |
| 5,870,723 A | 2/1999 | Pare, Jr. et al. | |
| 5,870,724 A | 2/1999 | Lawlor et al. | |
| 5,884,285 A | 3/1999 | Atkins | |
| 5,890,140 A | 3/1999 | Clark et al. | |
| 5,893,079 A | 4/1999 | Cwenar | |
| 5,911,135 A | 6/1999 | Atkins | |
| 5,913,202 A | 6/1999 | Motoyama | |
| 5,918,218 A | 6/1999 | Harris et al. | |
| 5,940,809 A | 8/1999 | Musmanno et al. | |
| 5,987,439 A | 11/1999 | Gustin et al. | |
| 6,006,206 A | 12/1999 | Smith et al. | |
| 6,035,276 A | 3/2000 | Newman et al. | |
| 6,041,312 A | 3/2000 | Bickerton et al. | |
| 6,098,053 A | 8/2000 | Slater | |
| 6,119,096 A | 9/2000 | Mann et al. | |
| 6,119,103 A | 9/2000 | Basch et al. | |
| 6,119,229 A | 9/2000 | Martinez et al. | |
| 6,128,602 A | 10/2000 | Northington et al. | |
| 6,195,708 B1 | 2/2001 | Sugimoto | |
| 6,202,054 B1 | 3/2001 | Lawler et al. | |
| 6,212,529 B1 | 4/2001 | Boothby et al. | |
| 6,223,187 B1 | 4/2001 | Boothby et al. | |
| 6,233,341 B1 | 5/2001 | Riggins | |
| 6,301,568 B2 | 10/2001 | Globuschutz | |
| 6,324,522 B2 | 11/2001 | Peterson et al. | |
| 6,331,972 B1 | 12/2001 | Harris et al. | |
| 6,336,152 B1 | 1/2002 | Richman et al. | |
| 6,349,291 B1 | 2/2002 | Varma | |
| 6,363,364 B1 | 3/2002 | Nel | |
| 6,408,282 B1 | 6/2002 | Buist | |
| 6,507,823 B1 | 1/2003 | Nel | |
| 6,513,019 B2 | 1/2003 | Lewis | |
| 6,529,725 B1 | 3/2003 | Joao et al. | |
| 6,606,606 B2 | 8/2003 | Starr | |
| 6,654,752 B2 | 11/2003 | Ofek | |
| 7,035,824 B2 * | 4/2006 | Nel | 705/42 |
| 7,058,817 B1 * | 6/2006 | Ellmore | 713/183 |
| 7,076,458 B2 * | 7/2006 | Lawlor et al. | 705/35 |
| 7,264,546 B2 | 9/2007 | Marshall et al. | |
| 7,324,972 B1 * | 1/2008 | Oliver et al. | 705/40 |
| 7,451,103 B1 * | 11/2008 | Boyle et al. | 705/35 |
| 7,620,565 B2 * | 11/2009 | Abelow | 705/10 |
| 7,672,892 B2 * | 3/2010 | Odom et al. | 705/37 |
| 7,693,790 B2 * | 4/2010 | Lawlor et al. | 705/40 |

* cited by examiner

300

302 — Total Balance: $405,210.00

304 —
First Fund Company

| Account | Tax ID | Fund name | SH reg. | Shares | Balance |
|---|---|---|---|---|---|
| 000111 | 123-45-6789 | Growth | John Smith | 400 | $150,111.00 |
| 000111 | 123-45-6789 | Tech Fund | John Smith | 100 | $ 50,111.00 |
| | | | | Total: | $200,222.00 |

306 —
Second Fund Company

| Account | Tax ID | Fund name | SH reg. | Shares | Balance |
|---|---|---|---|---|---|
| 999888 | 123-45-6789 | Income Fund | Trust for John Smith | 200 | $198,989.00 |
| 999888 | 123-45-6789 | IRA Fund | John & Mary Smith | 123 | $ 5,999.00 |
| | | | | Total: | $204,988.00 |

Figure 3

Vision Direct
Portfolio View

Current Portfolio: All Accounts

| Fund Name | Account Number | Current Price | Today's Change | % Change | # Shares | Market Value |
|---|---|---|---|---|---|---|
| Berger Funds | | | | | | |
| Next Gen Fund | 543214444 | $23.20* | +0.60 | +0.40% | 643.987 | $14,940.50 |
| Janus Funds | | | | | | |
| Janus Fund | 500321896 | $30.00 | +0.80 | +1.68% | 15.1230 | $453.69 |
| Mercury Fund | 123456789 | $31.00 | +1.44 | +2.42% | 24.0000 | $744.00 |
| Mercury Fund | 123456790 | $31.00 | +1.44 | +2.42% | 25.0000 | $775.00 |
| Tech. Fund | 555121211 | $35.00* | +2.50 | +3.21% | 10.1000 | $353.50 |
| Total Portfolio value: | | | | | | $17,266.19 |

Portfolio holdings as of: 12/01/1999.
Prices marked with a * are as of the previous business day.

View Portfolio History
Setup New Portfolio
Change Portfolio

Select an account number to view details of that account
Select a fund name to view fund information
Select a fund family name to visit the fund family's web site

Figure 4

| Vision Mutual Fund Gateway | | | |
|---|---|---|---|
| Monthly Billing Summary Report | | | |
| Report Number: R07960 | | | |
| Source program: B10108 | | | |
| Job: MFJM426B | | | |
| System: DFE | | | |
| Corp Billing ID | | | |
| Management Code: BU | | | |
| Billing Period: 11/1/99-11/30/1999 | | | |
| Billable inquiry Views: | 325 | View Charges | $ 16.25 |
| Billable Vision ID's: | 80 | Vision ID Charges | $ 400.00 |
| Billable Purchases | 100 | Purchases | $50.00 |
| Billable Redemptions | 35 | Redemptions | $17.50 |
| Billable Exchanges | 30 | Exchanges | $15.00 |
| Billable New Accounts | 50 | New Accounts | $25 |
| | | Total | $523.75 |

Figure 5

Sign on window

Management Company Selection window

Vision Menu Window

Shareholder Account History Window

| Columns | Field Name | Filed Type | M/O | Values | Description |
|---|---|---|---|---|---|
| 1-4 | Project ID | Alpha 4 | M | | Project identifier used to identify Assigned by DST. |
| 5-7 | Header Version | Num 3 | | Send spaces or null values | Version of Header. For future use. |
| 8-17 | Packet Length | Num 10 | M | | Total length of data stream including the header |
| 18-20 | Data Version | Num 3 | | Send spaces or null values | Version of the Data. For future use. |
| 21-30 | Data Length | Num 10 | M | | Length of data area, not including header (0 if no data) |
| 31-47 | Transaction ID | Alpha 17 | M | | Transaction identifier. For example, ACCTHIST@VISION. This format is required for each type of transaction. The field type/length remains the same. |
| 48-57 | Source System ID | Alpha 10 | | Spend spaces | Indicates the source of the message. This value is used for information purposes. DST will assign these values to the message originators. For future use. |
| 58-67 | Source Tag | Num 10 | M | Operator defined | This field can be used by the source application to attach an "identification" tag to individual transactions. This value will be returned in the response header. |
| 68-67 | Operator ID | Alpha 10 | M | Vision or External Fund ID | The operator ID (Vision) used to log on. |
| 78-85 | Password | Alpha 8 | M | Send Spaces | |
| 86-89 | Return Code | Num 4 | M | 0000 Normal 0010-Error | Return Code |
| 90-97 | Error Code | Alpha 8 | O | | Error Code from the target system. This could be used as a reference of the Vision operator should call the fund. |
| 98-337 | Error Data | Alpha 240 | | Send spaces | DST use only |

Figure 9

ERROR MESSAGES

| ERROR CODE | ERROR MESSAGE | DESCRIPTION |
|---|---|---|
| ACTF0001 | The request failed because the Host System has detected a problem. Please call the Vision Help line at 800-435-4112 and report the error code below for assistance. | Severe system error has occurred. |
| ACTF0002 | The system is currently performing updates as a result of today's business. The information you have attempted to retrieve is temporarily unavailable. Please try again later. We apologize for the inconvenience. Please click the back button on your browser to return to the previous page. | Files unavailable for read access due to system updates or file outages. |
| ACTF0003 | The request failed because your Operator ID is not authorized to perform this function. Please call the Vision Help line at 800-435-4112 for assistance. | Operator ID not authorized. |
| ACTF013 | The fund is currently unable to process this request within the allotted time. | The fund is unable to process this request either because of network overload or because the request cannot be processed within the allotted time. |

1000

1001 → ACTF0001
1002 → ACTF0002
1003 → ACTF0003
1004 → ACTF013

Figure 10

TRANSACTION FIXED REQUEST DATA — 1100

| Columns | Field Name | Filed Type | M/O | Values | Description |
|---|---|---|---|---|---|
| 1-13 | Security Issue ID | Alpha 13 | M | | Identifies the mutual funds. This field contains a two-character county code (00), A nine-character CUSU - a one-character check digit (0), and a one character test code (P). |
| 14-33 | Account Number | Alpha 20 | M | | The unique identifier for a shareowner account within a mutual fund |
| 34-58 | Index | Alpha 25 | M | | Index to request additional accounts when list is longer than a single request |

TRANSACTION VARIABLE REPEATABLE RESPONSE DATA 1200

| Columns | Field Name | Filed Type | M/O | Values | Description |
|---|---|---|---|---|---|
| 1-7 | Key Suffix | Num 7 | O | | Transaction sequence number in the history. |
| 8-13 | Transaction Identifier | Alpha 6 | O | | Indicates the type of transaction. Formatted as xxx/xxx (the '/' is hard coded after the third character). |
| 14-28 | Shares | Num 15 | M | 11.4 | Number of shares involved in the transaction. |
| 29-43 | Gross Amount | Num 15 | M | 13.2 | Dollar amount of the transaction. |
| 44-58 | Running Balance | Num 15 | M | 11.4 | Cumulative share balance of account. |
| 59-68 | Confirmation Date | Char 10 | M | MM/DD/YYYY | Date transaction was processed. |
| 69-78 | Trade Date | Char 10 | M | MM/DD/YYYY | Date transaction was priced. |
| 79-87 | Price | Num 9 | M | 5.4 | Price used for the transaction. |
| 88-94 | Batch Number | Num 7 | O | | Transaction processing group number. |
| 95 | Pre/Post Noon | Alpha 1 | O | B=Before Noon A=After Noon | Determines if the transaction occurred before noon or after noon. |
| 96-97 | Discount Category | Num 2 | O | | Code indicating the price break a shareholder will receive on new shares purchased. |
| 98 | Certificate Issue Code | Alpha 1 | O | Y/N | Indicates certificate was issued on a purchase transaction. |
| 99-128 | Transaction Description | Alpha 30 | M | | The alpha description of the transaction. |

1201 → (row 1-7)
1202 → (row 8-13)
1203 → (row 14-28)
1204 → (row 29-43, 44-58)
1205 → (row 59-68)
1206 → (row 98, 99-128)

Figure 12

Enrollment Form
Branch Access

This enrollment form provides access to all accounts assigned to your branch office. If you are in the incorrect form, please click "Cancel & Close Window". If this is the correct form for the access you require, please scroll down to complete. Fields marked in bold are required.

[Cancel & Close Window]

Broker/Dealer Name: [            ]
Firm Name: [            ]

Last: First:
Contact Person: [        ] [        ]
Contact's E-Mail Address: [            ]

*Correspondence regarding Vision access is communicated by e-mail; without a valid e-mail address, some communication may be delayed.*

Mailing Address: [            ]
[            ]
[            ]

City: [            ]
State or Province: ZIP Code:
[        ] [    ]-[    ]

Country: [United States ▼]
Phone Number: ([   ]) [   ]-[   ] ext.[   ]
Fax Number: ([   ]) [   ]-[   ]
Number of Required Vision IDs: [1            ]

[Continue] [Reset]

[Cancel Enrollment]

FIGURE 14(e)

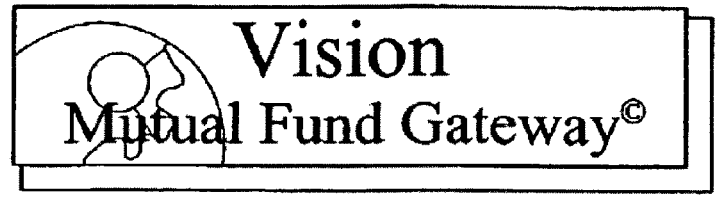

Enrollment Form
Representative Access

This enrollment form provides access to your individual accounts in which you are the representative or advisor of record. Each representative must complete his or her own enrollment. If you are in the incorrect form, please click "Cancel & Close Window". If this is the correct form for the access you require, please scroll down to complete. Fields marked in bold are required.

[Cancel & Close Window]

Fields marked in bold are required. Correct completion of this form is essential to processing your enrollment. An incomplete form will be returned to you and your enrollment will not be processed until the correct information is submitted.

(If you are not affiliated with a Broker/Dealer, type FEE ADVISOR in this field.)

Broker/Dealer Name: [            ]
Firm Name: [            ]
Contact Person: Last: [      ] First: [      ]
Contact's E-Mail Address: [            ]

Correspondence regarding Vision access is communicated by e-mail; without a valid e-mail address, some communication may be delayed.

Mailing Address: [            ]
[            ]
[            ]
City: [            ]
State or Province: [    ] ZIP Code: [    ]
Country: [United States ▼]
Phone Number: ([  ])[  ]-[  ] ext.[  ]
Fax Number: ([  ])[  ]-[  ]
Number of Required Vision IDs: [1            ]

[Continue] [Reset]
[Cancel Enrollment]

FIGURE 14(f)

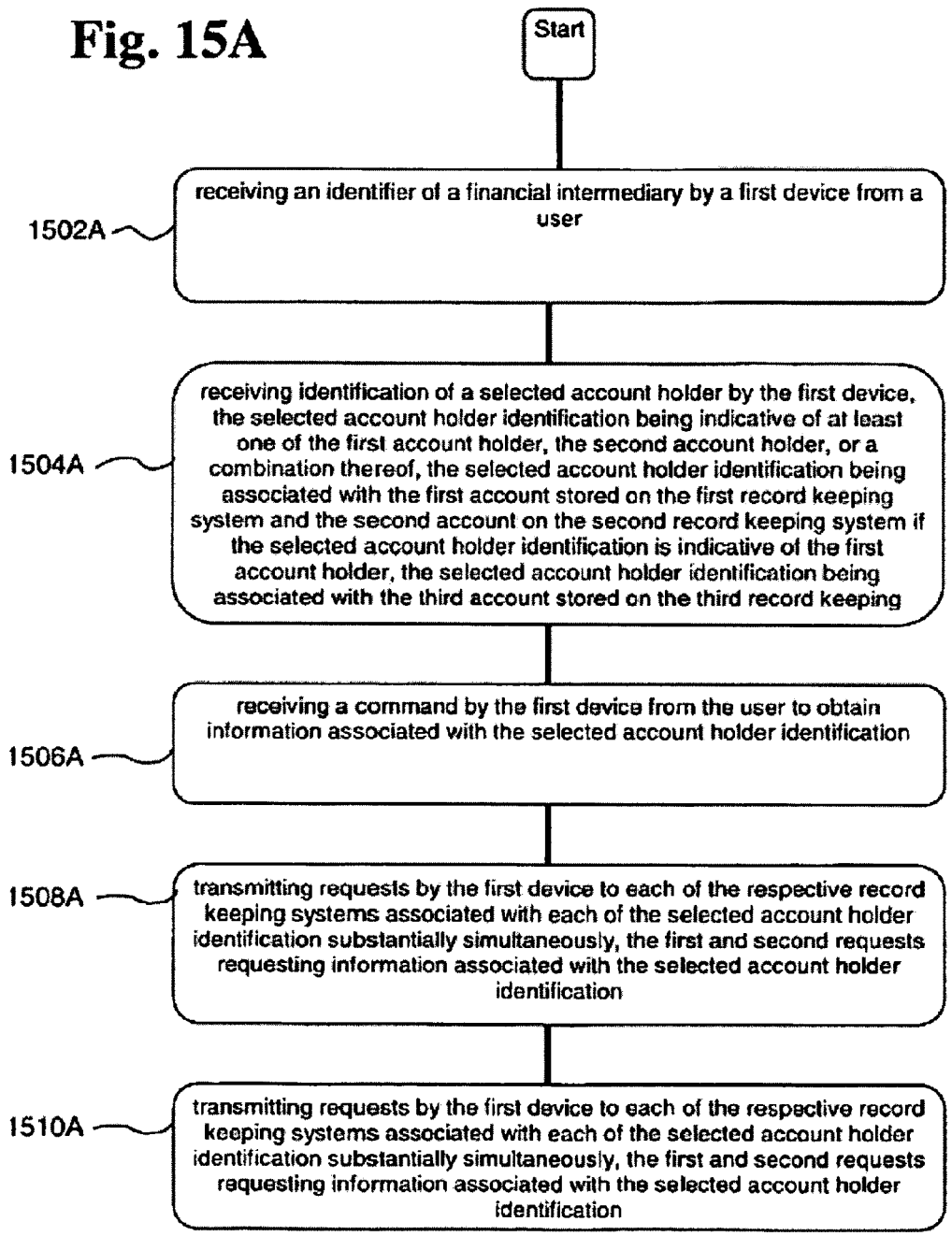

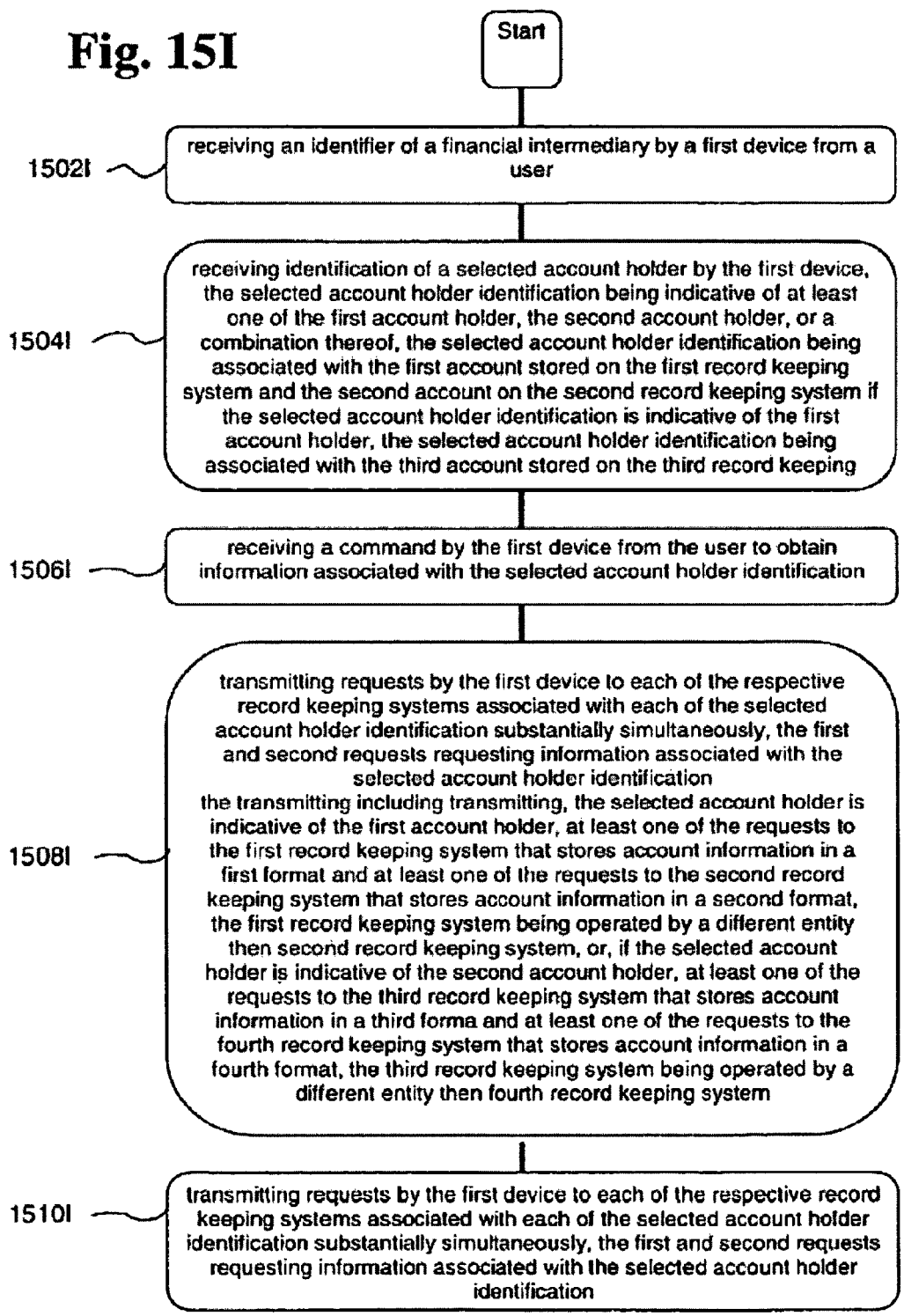

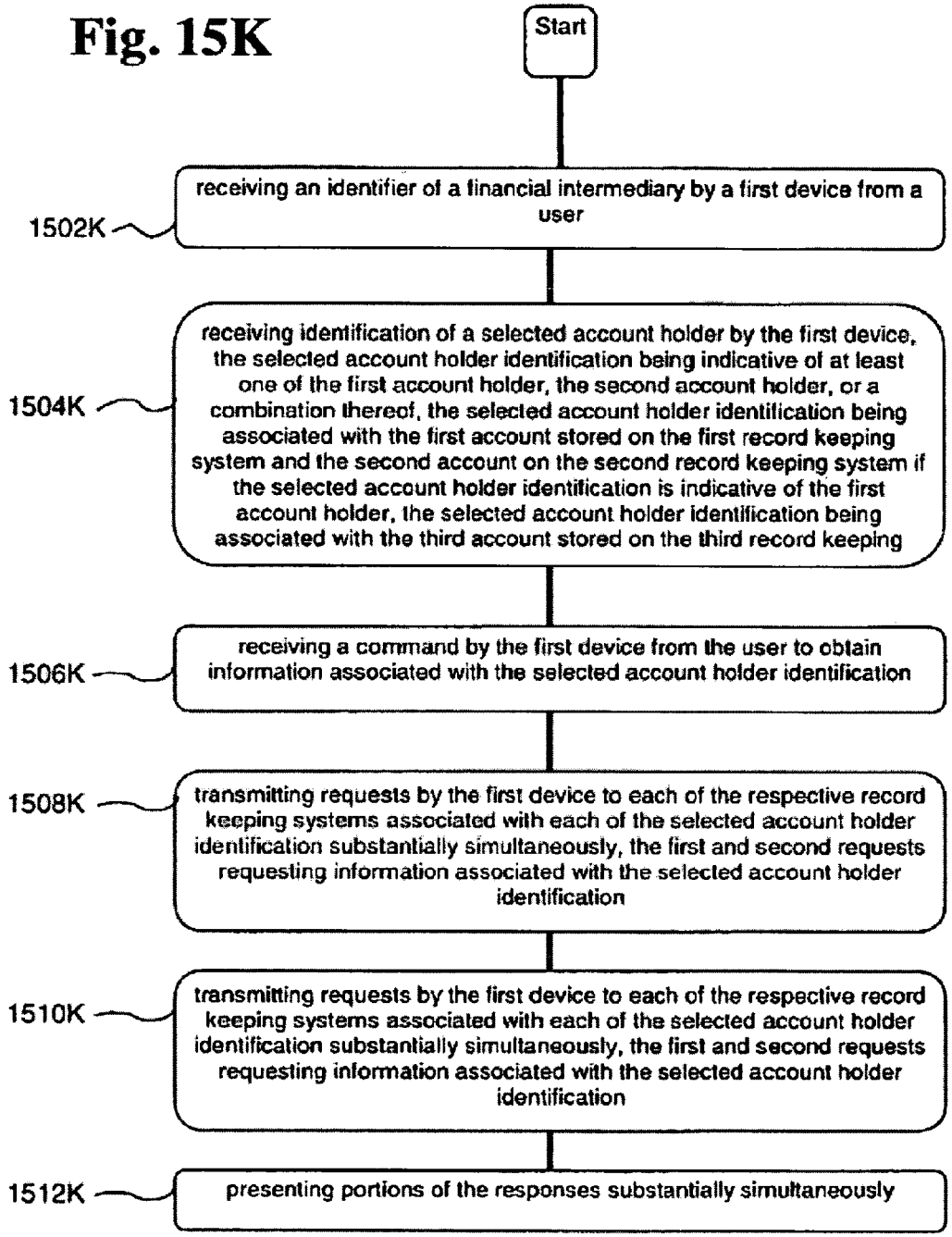

SIMULTANEOUS REAL-TIME ACCESS TO FINANCIAL INFORMATION

RELATED APPLICATIONS

This application is a divisional application of application Ser. No. 11/821,872, entitled "Simultaneous Real-Time Access To Financial Information," filed Jun. 26, 2007, now U.S. Pat. No. 7,686,208 which is a continuation of application Ser. No. 09/475,637 entitled "Simultaneous Real-Time Access To Financial Information," filed Dec. 30, 1999, now U.S. Pat. No. 7,275,046 which is hereby incorporated by reference.

The following applications are related by subject matter and are hereby incorporated by reference:

Application Ser. No. 09/475,634 entitled "Real-Time Presentation of Financial Information," now abandoned.

Application Ser. No. 09/475,636 entitled "Method of Accessing Financial Information," now abandoned.

Application Ser. No. 09/476,073 entitled "Method of Account Holder Access to Financial Information," now abandoned.

Application Ser. No. 09/475,538 entitled "Method of Charging for Access to Financial Information," now abandoned.

BACKGROUND

A user of financial system must log-on to the financial system before the user performs an action such as an inquiry or a transaction. If the user wishes to access another financial system, the user must log-on to the second financial system. Each financial system usually has its own menus and presents information in its own manner. Thus, a user, who wishes to access multiple financial systems, must remember multiple log-on user IDs and passwords and learn to operate each financial system. This process is time consuming and difficult. If the user wishes to access information from multiple financial systems, the user access each financial system serially, create time lags between accesses. Additionally, some financial systems charge fees based on the user's actions. If a database provider, also called a data warehouse company, maintains the database for the financial institution and provides access to the users, the database provider charges access fees. However, access and fees are limited to fees associated with accessing the databases that the database provider maintains.

BRIEF SUMMARY

The present invention is defined by the following claims, and nothing in this section should be taken as a limitation on those claims. By way of introduction, the preferred embodiments describe below include a method of simultaneously presenting user specific real-time financial information includes authenticating a user, for example by using a user-id and password. Then receiving an input from the user indicating the shareholder of interest. The user is then presented with a list of the shareholder's account information. The shareholder account information can be retrieved from several different record keeping systems. The record keeping systems can be maintained by different entities and can store the respective account information in different formats.

The shareholder account information can be retrieved by broadcasting an account inquiry to the record keeping systems or by using a cross-reference table that indicates which record keeping systems the shareholder has accounts with. A combination of the broadcast and cross-reference table can be used.

Once the shareholder account information is presented, the user can select an account, for example by a hyperlink tag, and receive detailed information about that account.

BRIEF DESCRIPTION OF SEVERAL VIEWS OF THE DRAWINGS

The present invention is illustrated by way of example and not limitation in the accompanying figures. In the figures, like reference numbers indicate identical or functionally similar elements. Additionally, the left-most digit(s) of a reference number identifies the figure in which the reference number first appears.

FIG. 3 is a diagram of an embodiment of a screen with multiple regions displaying real-time financial information from multiple record keeping systems simultaneously;

FIG. 4 is one embodiment of a screen with a portfolio view;

FIG. 5 is a representation of a bill showing the charges;

FIG. 9 is a representation of an embodiment of a header portion of a message;

FIG. 10 is a representation of an embodiment of error codes for FIG. 4;

FIG. 11 is a representation of an embodiment of a request message;

FIG. 12 is a representation of an embodiment of a response message;

FIG. 14(a)-14(f) are representations of windows for enrolling a new user or adding access to additional financial institutions; and FIGS. 15A-15L are flow charts depicting the operation of alternate embodiments of FIG. 1.

DETAILED DESCRIPTION OF THE PREFERRED EMBODIMENTS

A financial intermediary, such as a stockbroker, needs to access his clients' financial information. The clients' financial information often includes information about accounts at different mutual fund companies and that information is often maintained on different record keeping systems. The present invention allows the financial intermediary to view substantially simultaneously the clients' financial information from multiple record keeping systems with one user ID and password. This significantly simplifies the process of accessing the clients' financial information.

DST Systems' Vision Mutual Fund Gateway (Vision) incorporates some, but not all, of the features describe below. Vision includes an interactive internet site, www.dstvision.com, that allows financial intermediaries to access financial information in a real-time environment. Financial intermediaries include broker/dealers, financial advisors, financial representatives, and other. The financial information accessible through vision includes fund, shareowner account, and dealer information. Specifically, the financial information includes real-time information such as shareholder positions, account options, transaction histories, fund pricing and yields. Further, the financial information includes fund information, net asset value summaries, distribution information, order information, dealer information, branch information, representative information, and account summaries by representatives or advisor number. Vision also supports information inquiry that include inquiries to account information by dealer account number, fund account number, shareholder name, tax identification number or social security number, and representative or advisor number.

Vision provides access to all authorized fund groups via a single log-on, real-time fund and shareholder account information, transaction processing, and new account creation. Vision is accessible via an intranet or other networks, such as the Internet.

Figure 1:
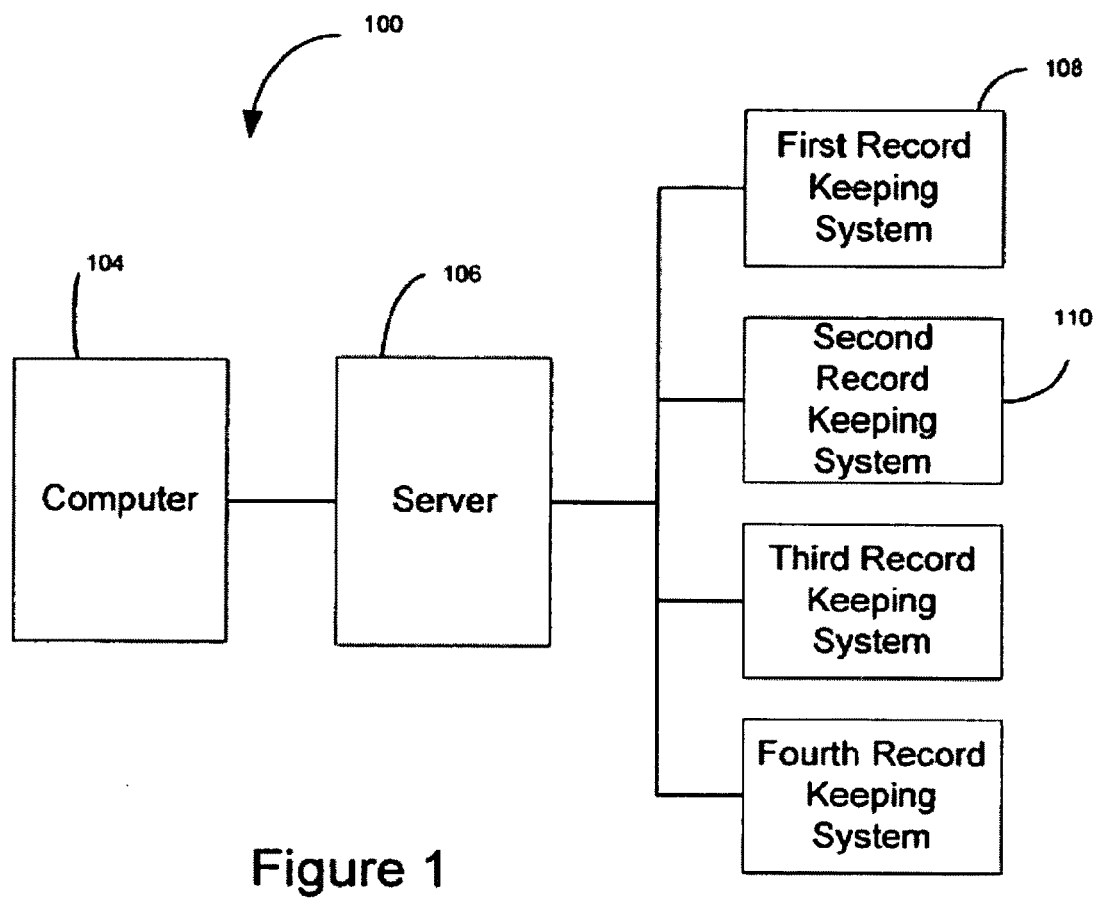
FIG. 1 is a representation of an embodiment of a system for accessing financial information.

FIG. 1 is a representation of an embodiment of a system 100 for accessing and presenting financial information. The system 100 includes a computer 104, a server 106, and first and second record keeping systems 108, 110. The computer 104 includes a personal computer, terminal, laptop, palmtop, mainframe, or other device capable of communicating with the server 106. In an embodiment, the computer 104 includes an output device such as a monitor, a diskette drive, or a printer. The computer 104 includes an user interface for receiving inputs from the user and providing outputs to the user.

The server 106 communicates with the computer 104 and a plurality of record keeping systems, for example the first record keeping system 108 and the second record keeping system 110. In an embodiment, the server 106 includes an access module and an user interface module. The access module is capable of accessing a plurality of independent substantially real-time financial record keeping databases. The user interface module is capable of receiving inputs from a user and presenting results to a user. In an other embodiment, the server 106 includes a user interface, record keeping system interface, and a router. The user interface communicates with an authorized user and receives user requests from the user and transmits user responses to the user. The record keeping system interface accesses information on first and second record keeping systems that maintain respective first and second account information in different formats. The router routes user requests to the first or second record keeping system as appropriate.

In a preferred embodiment, the first and second record keeping systems 108, 110 are owned by different entities, such as mutual fund companies. The server 106 may be owned by the same entity that owns one of the first and second record keeping systems 108, 110 or other entity. An example of a record keeping is DST Systems' TA2000®.

In an embodiment, the records stored in the first and second record keeping systems 108, 110 are stored in different formats. In another embodiment, the record keeping systems 108, 110 have different data structures or different operating systems. The record keeping systems 108, 110 are controlled by a.) a data warehouse company that maintains the data for a financial institution, b.) the financial institution maintains their own data warehouse, or c.) another entity.

The records stored in the first and second record keeping systems 108, 110 include account information, such as mutual fund accounts, annuities, and other financial information, and fund information, such as yield to date, and net asset value. The records may include other account and/or fund information.

A user at the computer 104 accesses the information stored on the first and second record keeping systems 108, 110 through the server 106. Preferably the user is a financial intermediary. The computer 104 accesses the server 106 via the Internet, a direct connect, an intranet, or other mechanism. Preferably, the computer 104 accesses the server 106 via the Internet using the secure socket layer protocol (SSL). Preferably, the first and second record keeping systems 108, 110 maintain real-time financial information on accounts and funds.

The server 106 maintains several databases that track relationships. The relationships are stored in tables, database, flat files, or with other mechanisms. These databases include authentication information, such as the operator ID and password that are used during user log-on. The databases include the relationship between the operator ID and remote systems operator IDs.

For example, a user signs onto the system 100 using an operator ID and password. When that user accesses a record keeping system, the server 106 determines an second ID for the record keeping system associated with the operator ID and password. The server 106 sends a request for information to the record keeping system with the second ID, that is the operator ID or remote system operator ID. Thus, a user need only remember the operator ID and password for the server 106, and need not know the IDs for the record keeping systems. Each record keeping system uses its own ID or the server operator ID.

The server 106 also maintains information representing the relationships between operator ID and the user's financial companies. For example, after a user logs-on to the server 106 with an operator ID and password, a list of fund families is presented. The list includes the funds that the user is allowed to access. Fund families are also called fund companies, mutual fund companies, and management companies.

The server 106 also maintains a routing table that represents the relationship between the fund companies and the record keeping system where their financial data is stored. This table is used to route request to record keeping systems. Financial data includes account data and fund data.

For example, when the server 106 receives an inquiry for fund information, the server 106 determines which record keeping entity has the data for that fund. A request for an action is then transmitted to that record keeping entity. Preferably, the request includes an action code or action indicator that indicates an action to be taken. Likewise, the response includes a response code or response indicator that indicates the status of the action. In one embodiment, the record keeping systems are directly connected with the server 106, and the routing includes port identifications, where each record keeping system is associated with a port. Preferably, the server 106 communicates with the first and second record keeping systems via a secure access, such as a direct connection. In this example, the server 106 is a trusted system and the first and second record keeping systems do not require the server 106 to be authenticated. The action can include an inquiry, a transaction, or other activity related to an account or fund. In a preferred embodiment, the record keeping systems are directly connected with the server 106, and the routing includes port identifications, where each record keeping system is associated with a port. Preferably, the server 106 communicates with the first and second record keeping systems via a secure access, such as a direct connection. In this example, the server 106 is a trusted system and the first and second record keeping systems do not require the server 106 to be authenticated.

Financial intermediaries are often associated with dealer, branch, and representative identifiers. In a preferred embodiment, the record keeping system may maintain the relationships between each operator ID and the operator's dealer, broker, and representative. The dealer, broker, representative information is used to control access to account and fund information on the record keeping system. For example, a representative has access to his clients' account information. A branch manager has access the account information of the representatives in that branch. A dealer has access to the account information of the representatives at each branch.

Alternatively, the server 106 maintains the relationships between a user's operator ID and the dealer, branch, and representative associated with the operator ID. The dealer, branch, and representative is provided to the record keeping system in a request for information or a request for a transaction.

In a preferred embodiment, the first record keeping system 108 is a TA2000® system and the server 106 is a FAN® switch and a Stratus® server.

Optionally, a user at the computer 104 also accesses a record keeping system independently of the server 106. For example, direct connection is offered by some record keeping systems.

After the server 106 transmits a request for information to a record keeping system, the server 106 receives a response from the record keeping system. The server 106 evaluates the response and selectively presents a portion of the response to the use. The response includes the requested information or an error message. Portion of multiple responses can be presented to the user serially or substantially simultaneously.

In an embodiment, the server 106 executes a computer program(s) embodied on a computer-readable medium capable of presenting real-time financial account information to authenticated users. The computer program(s) includes a security module, a communication module, and a presentation module. The security module authenticates users for example with a user ID and password. The communication module communicates with at least first and second record keeping systems. The first and second record keeping system storing at least first and second real-time financial accounts in respective first and second storage formats. The first storage format being different from the second storage format. The communication module sending first and second requests for real-time financial account information to the respective first and second record keeping systems and receiving first and second responses from the respective first and second record keeping systems. The presentation module presents a portion of the first and second responses serially or substantially simultaneously.

In another embodiment, the server 106 includes an access module and a user interface module. The access module accesses a plurality of independent substantially real-time financial record keeping databases. The user interface module receives requests and presenting results relating to the plurality of independent substantially real-time financial record keeping databases. The user interface module presents a uniform set of user displays for accessing the independent substantially real-time financial record keeping databases. Some of the modules described above may be implemented separate from the server 106, such as on the computer 104.

The user provides authentication information, such as a user identification and password. Preferably, the user establishes an account by accessing an Internet based site and entering a user ID and password. Then the user enters contact and verification information that includes user's name, address, social security number, phone number, e-mail address, and other information. During subsequent accesses, the user enters the user ID and password. When a user has forgotten a user ID or password, a message containing the forgotten information can be sent to a secure e-mail system, such as DST Systems' ePriority system. Alternatively, a user enters information such as social security number, and/or date of birth to verify their identity, and the forgotten information is presented to the user. Once authenticated, the user enters an identification or identifications of the account holder(s) that the user wishes to get information about. A request for account information associated with the account holder identification(s) is sent to various record keeping systems. A response is received from those record keeping systems.

The request for account information is sent to the record keeping systems known to have information associated with the account holder identification. This can be determined by using a cross-reference table that indicates which record keeping systems have information associated with a given account holder's identification. This cross-reference table is created after the user enrolls with the server 106. Preferably, the record keeping systems or the financial institutions provide the cross-reference information to server 106. Some record keeping systems or the financial institutions may choose not provide the cross-reference information. In this case, they receive a broadcast request for information every time a request for information is sent.

Alternatively, this cross-reference between account holder's identification and accounts is created during the enrollment process where each fund company is identified by the user. A cross-reference between fund company and record keeping system is used to create the cross-reference table between account holder identification and record keeping system.

Alternatively, the cross-reference table is created in whole or in part based on previous responses to broadcast requests for information. That is, a request for account information associated with an account holder identification is sent to some or all of the known record keeping systems. The broadcast is performed periodically or on an ad hoc basis. The responses indicate which record keeping systems have account information associated with them. This information is used to update the cross-reference table. This is an example of a dynamic cross-reference table.

The requests for account information are transmitted based on a cross-reference table and/or based on a list of record keeping systems or financial institutions that are known not to be included in cross-reference table. Some entities maintaining record keeping systems or financial institutions may prefer to receive a request every time a request is made and then determine if the requested account information is available instead of maintaining cross-reference tables.

While financial intermediaries accessing mutual fund accounts have been used as an example, the present invention as defined by the claims can be applied to other financial accounts such as annuities, credit accounts, bank accounts, and other financial accounts.

Optionally, the system 100 allows the user to maintain multiple portfolios having different accounts within each portfolio. For example, a user has a first portfolio with accounts that are part of a 401K plan, a second portfolio with accounts that are not part of a 401K plan, and a third portfolio with the accounts in the first and second portfolios. Each portfolio includes accounts from one or more different financial institutions, and the account data is maintained by the same or different record keeping companies. The user edits, deletes, and creates new portfolios as desired.

In one embodiment, the system 100 accesses no-load mutual fund data from a plurality of financial institutions maintained on a plurality of record keeping systems. The user accesses the account information by navigating a set of screens. A single user ID and password gives the user access to the plurality of accounts. The user performs inquiries, transactions, and account servicing for each of the accounts. Optionally, a consolidated view of the user's accounts is presented.

Optionally, the provider of the services described above charges fees for accessing the account information. It is preferred that the fees be charged to the financial institutions. Alternatively, the account holder, a third party, or a combination thereof is also charged. Possible fees include: setup fees, monthly operator ID fees, per view fees, per transaction fees, registration fees (also called new account fees), monthly minimum fees, and other fees. Optionally, advertising fees are charged for advertisements that appear on a screen.

For example, the fee are as follows: inquiry view fee $0.05, user ID fee $5 per month per financial institution, purchase fee $0.50, redemption fee $0.50, exchange fee $0.50, new account fee $3, account position inquiry $0.05, account history inquiry $0.05, portfolio position inquiry $0.05, transactions $0.50. Alternatively, the fees are inquiry views $0.05 and transactions $0.50. Different fees, combinations of fees and/or fee amounts may be used.

The user performs actions including inquiry, transactions, and account maintenance. The inquiry actions include portfolio positions (shares price, market value, etc.), portfolio history (transactions across accounts, etc.), account details (registration, dividend options, account options, etc.), and account history (transactions within an account). The transaction actions include purchases by an automated clearing house (ACH) to new or existing accounts, redemption by ACH, withdraws by check, withdraws by wire, exchanges to new or existing accounts within the same fund family, and exchanges to new or existing accounts across fund families. Account maintenance actions include ordering duplicate statements, viewing statements on-line, ordering duplicate tax forms, viewing tax forms on-line, viewing year-end information, ordering checkbooks, changing address, updating distribution options, adding/updating systematic agreement files, updating bank information, establishing new accounts, and averaging costs. Other inquiries, transactions and/or account maintenance actions may be provided.

In a preferred embodiment, the system provides financial planning capabilities including asset allocation graphs by investment and Morningstar data or other value service data.

Optionally, the server 106 charges for access to real-time financial information stored on independent systems and includes an access module and a fee module. The access module provides user access to a first real-time financial account on a first system and a second real-time financial account on a second record keeping system. The first account being associated with a different financial institution then the second account. The fee module calculates at least first and second fees based on accesses to the respective first and second financial institutions. The fees are a function of user initiated activities. Optionally, the fee module includes a billing module that transmits a bill electronically.

Figure 2:
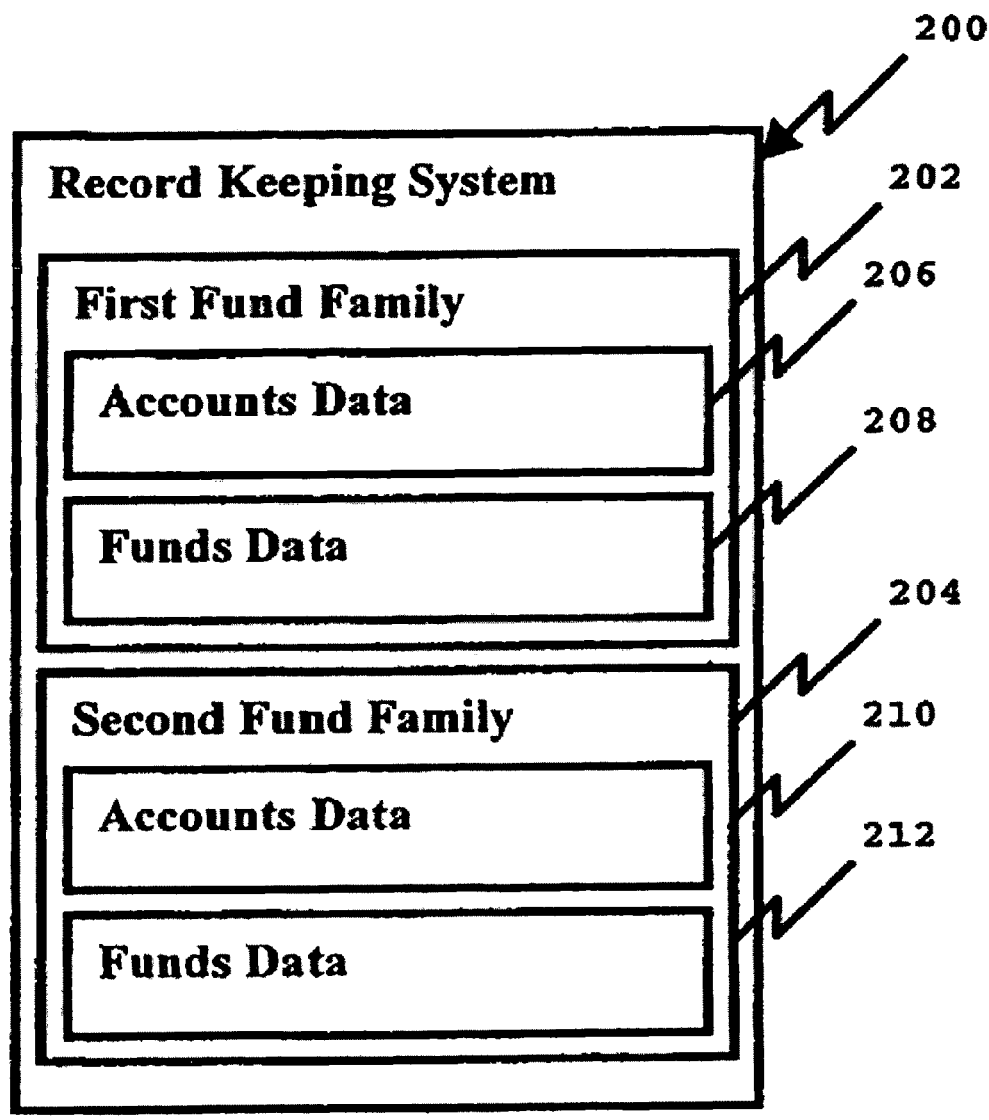
FIG. 2 is a representation of an embodiment of databases stored in a financial record keeping system.

FIG. 2 is a representation of an embodiment of databases stored in a financial record keeping system. The record keeping system format 200 includes information on fund families, 202, 204. The first fund family 202 includes information related to a plurality of accounts in the accounts data 206 and information related to a plurality of funds in the funds data 208. The second fund family 204 includes information related to a plurality of accounts in the accounts data 210 and information on a plurality of funds in the funds data 212. Preferably, the funds include mutual funds and annuities, however, the invention also includes stocks, bank accounts, or other financial accounts. The funds data 208, 212 includes such information as daily yields, year to date performance, total value, and other information.

In one example, the record keeping systems 200 is the first record keeping system 108 (FIG. 1) and is maintained and controlled by DST Systems, the first and second fund families 202, 204 are respectively the First Fund Company and the Second Fund Company. The First Fund Company has a thousand accounts each owned by one or more account holders. The First Fund Company has twenty funds, such as a domestic growth fund, an international growth fund, a money market fund, and a balanced fund. The second record keeping system 110 (FIG. 1) is maintained by a mutual fund company and includes information on only the mutual fund company's mutual funds and accounts.

The fund families are mutual fund families, or other grouping of accounts usually at the same financial institution. The accounts represent annuities, money markets, margin accounts, bank accounts, credit accounts, and/or other accounts.

FIG. 3 is a diagram of an embodiment of a screen 300 includes a balance area 302, a first account area 304, and a second account area 306. Additional account areas will be included if more accounts are retrieved. The screen 300 may be presented to a user on the computer 104 (FIG. 1) on a monitor. The balance area 302 that includes information, such as, a summary of information in the first and second account areas 304, 306. Optionally, the balance areas 302 also includes information relating to the account holder such as the account holder's name, address, phone number, and other information. The first and second account areas 304, 306 each include information from different record keeping systems and/or account information. In the embodiment shown in FIG. 3, the first account area 304 shows information relating to the "First Fund Company". The account holder, "John Smith", has two accounts with First Fund Company. These accounts have the same account number "000111" and different fund names "Growth" and "Tech Fund." Account information about John Smith's accounts include his tax ID, for example his social security number, the number of shares, and the balance. Other account information can also be included.

Once screen 300 is presented to the user, the user receives further details of any account by selecting the desired account. The desired fund is selected by activating a hyper link on the display, by entering the account information, or by any other means.

Preferably, the account information shown in FIG. 3 is substantially real-time financial information.

While FIG. 3 shows a first record keeping system with a first and second fund family having account data and fund data, other embodiments may have similar or different structure and include similar or different information. For example, the fund families are replaced with annuity family, or accounts at a particular financial institution that may include some mutual funds, some annuity funds, some brokerage accounts, and/or other accounts. In these cases, the account data contains information about the accounts. However, the type of information may vary based on the type of account.

The second account area 306 shows information for John Smith at the Second Fund Company.

For example, the screen 300 having substantially real-time financial information that is stored on a first record keeping system and a second record keeping system, the first record keeping system being different from the second record keeping system is accessed by the following method.

The server 106 (FIG. 1) receives an account holder identification from a user. The account holder identification is associated with a first account information stored on the first record keeping system and a second account information on the second record keeping system. The server 106 transmits first and second requests to the respective first and second record keeping systems. The first and second requests request information associated with the account holder identification. The server 106 receives first and second responses from the respective first and second record keeping systems. The first and second responses include substantially real-time financial information associated with the account holder identification. Optionally, the server 106 presents a portion of the responses to the user.

Optionally, the first request is transmitted based on a cross-reference of account holder identification to record keeping systems and the second request is transmitted based on a list of record keeping systems known to be absent from the cross-reference. For example, the first request is transmitted based on Table 1 and Table 2 and the second request is transmitted based on Table 3.

Table 1 is an embodiment of a cross-reference table showing relationships between account holder, tax ID, first and second account holder id, and record keeping system. Table 1 shows an account holder that has different account holder identifications for each record keeping system.

TABLE 1

| Account Holder | Tax ID | First Account Holder ID | Second Account Holder ID | Record Keeping System |
|---|---|---|---|---|
| John Smith | 123-45-6789 | JS0000123 | JS0000123 | First RKS |
| John Smith | 123-45-6789 | JS0000123 | JS0000123 | First RKS |
| John Smith | 123-45-6789 | JS0000123 | XYZ00999 | Second RKS |
| Mary Jones | 111-22-3333 | MJ101010 | MJ101010 | First RKS |
| Mary Jones | 111-22-3333 | MJ101010 | 444555666 | Second RKS |
| Mary Jones | 111-22-3333 | MJ101010 | 444555666 | Third RKS |
| Mary Jones | 111-22-3333 | MJ101010 | 87654321 | Fourth RKS |

Table 2 is an embodiment of a cross-reference table showing relationships between account holder, tax ID, second account holder ID, financial institutions, and account identifier. Table 2 shows that an account holder may have several accounts at one or more financial institutions and the account information is stored on different record keeping systems as indicated in Table 1.

TABLE 2

| Account Holder | Tax ID | Second Account Holder ID | Financial Institution | Account Identifier |
|---|---|---|---|---|
| John Smith | 123-45-6789 | JS0000123 | ABC Funds | 1000333 |
| John Smith | 123-45-6789 | JS0000123 | CDF Funds | 2200333 |
| John Smith | 123-45-6789 | XYZ00999 | XYZ Funds | 990099 |
| Mary Jones | 111-22-3333 | MJ101010 | ABC Funds | 1000111 |
| Mary Jones | 111-22-3333 | 444555666 | PDQ Funds | 2234343 |
| Mary Jones | 111-22-3333 | 444555666 | DEF Funds | 333444 |
| Mary Jones | 111-22-3333 | 87654321 | HIJ Funds | 44440001 |

Table 3 is an embodiment of a table showing relationships between record keeping systems and financial institutions. Table 3 shows the record keeping systems and financial institutions that are accessible to the server 106 (FIG. 1) but are do not maintain their accounts in the cross-reference tables Table 1 and Table 2. The record keeping systems and financial institutions in Table 3 receive a broadcasted request every time the server request account information.

It is preferred that all financial institutions whose account information is maintained on a given record keeping system maintain the cross-reference tables Table 1 and Table 2. In an alternative embodiment, only some financial institutions on a given record keeping system choose to not maintain the cross-reference between account holder and financial institutions and associated record keeping systems. While the record keeping systems or the financial institutions maintain the cross-reference between account holder and financial institutions and record keeping systems, the server 106 (FIG. 1) would has a copy of the cross-reference table for routing requests. While maintenance of the cross-reference is performed by the record keeping system or the financial institution, however, the server 106 may also maintain the cross-reference table. For example, in an embodiment with a dynamic cross-reference table, the server 106 is constantly or periodically updates the cross-reference table.

TABLE 3

| Record Keeping System (Broadcast) | Financial Institutions |
|---|---|
| Fifth RKS | All Financial Institutions |
| Sixth RKS | All Financial Institutions |
| Seventh RKS | All Financial Institutions |
| Second RKS | TUV Fund Company, LMN Fund Company, and AAA Annuity Company |

FIG. 4 shows a screen 400 with a portfolio view. The screen 400 includes a title area 402, a portfolio selection area 404, a portfolio data area 406, a portfolio option area 408, and a message area 410.

The title area 402 includes an application title, for example "Vision Direct" and a window title, for example "Portfolio View." The portfolio selection area 404 allows the user to select a portfolio.

The portfolio data area 406 includes various information relating to the user's accounts. In one embodiment, the portfolio data area 406 includes the fund name, account number, current price, daily change in dollars per share, daily percentage change, number of shares, and current market value. The portfolio data area 406 may include other information about the accounts in the portfolio. The portfolio data area 406 also includes a portfolio total that represents the total value of the accounts displayed. Additionally, totals for the accounts in each financial institution may be included. In one embodiment, the portfolio data area 306 includes a date field that allows the user to access the information as of a specified date.

In one embodiment, the portfolio option area 408 includes options to view a portfolio history, setup a new portfolio, and change a portfolio.

The message area 410 includes instructions or messages for the user. For example, the instructions include instructions on how to view account details, how to view fund information, and how to visit a fund family's web site.

Optionally, other screens display various types of account and fund information.

FIG. 5 is a representation of a bill 500 that includes a header area 502, an identifier area 504, and a charges area 506. The header area 502 indicates the source of the bill, "Vision Mutual Fund Gateway" and the type of bill, "Monthly Billing Summary Report." The identifier area 504 includes such information as the report number, source program, job, system, corporate billing ID, management company code, and billing period. The charges area 506 includes summary data on the charges for the period identified in the identifier area 504. The charges area 506 includes the number of action and the charges for those actions. The actions include views, vision IDs, purchases, redemptions, exchanges, and new accounts. The calculation of the charges associate with the actions are described below.

Revenue is generated for the entity providing access to financial information. For example, the entity is an entity operating the server 106 (FIG. 1), provides access to the user via the Internet, and providing access to various record keeping systems. Some of the record keeping systems may be provided by the same entity as the server 106 while other record keeping systems are provided by other entities. Each record keeping system maintains data on one or more financial accounts, such as mutual fund account in one or more financial institutions. Optionally, the mutual fund company maintains the record keeping.

The service provider, usually the company maintaining the server 106 (FIG. 1), generates revenue by charging one or more of the following fees: a setup fee, a monthly operator ID fee, a per view fee, a per transaction fee, a registration fee (also called a new account fee), a monthly minimum fee, and other fees.

The setup fee is charged for establishing access to a new financial institution through the server 106 (FIG. 1). For example, if a mutual fund company wishes to provide access to accounts through the server 106, the service provider charges a setup fee. The setup fee may be any amount, such as $1,000, $5,000, $1,000,000, or another amount. The setup fee may be varied based on whether the financial institution is maintaining data on a record keeping system maintained by another entity or is maintaining its own data. For example, the setup fee for a financial institution maintaining its own data is half of the regular setup fee. In a preferred embodiment, the setup fee is $5,000 for new customers and $2,500 for existing customers. Preferably, the setup fee is charged to the financial institution.

The operator ID fee, also called user ID fee and user identification fee, is charged periodically, for example monthly, for each operator that has access to each account. If an operator has access to more than one account (or fund), then that operator ID fee charged for each account.

The operator ID fee is any amount, including $0.05, $0.50, $1, $2, $3, $4, $5, $100, or more. Discounts can be provided for higher volume financial institutions. The discounts are based on a graduated fee basis in one embodiment. For example, the first 500 operator IDs are $5/ea. per month, the next 500 operator IDs are $4/ea. per month, the next 1000 operator IDs are $3/ea. per month, the next 1000 operator IDs are $2/ea. per month, and each operator ID beyond 3000 is free. In this example, the maximum fee would be $9,500/mo.

The view fee is charged for viewing the result of an inquiry. The inquiry may include information from several accounts and only one view fee is charged. Alternatively, the view fee is based on the number of accounts accessed. For example, the view fee is $0.01, $0.05, $0.10, or an other amount per view. Preferably, the view fee is charged to the financial institution.

The transaction fee is charged for each transaction performed. Transactions include purchases, redemptions, exchanges, and/or other transactions. The transaction fee is $0.01, $0.5, $0.50, or another amount per transaction. Preferably, the transaction fee is charged to the financial institution.

The new account fee, also called a registration fee, is charged for each new account. In a preferred embodiment, a single new account fee is charged when multiple accounts for the same shareholder or owner are established at the same time in the same mutual fund family. The new account fee is $0.50, $1, $3, $5, or an other amount. Preferably, the new account fee is charged to the financial institution.

The monthly minimum fee is charged when the total of the other monthly fees are below a desired level. For example, the monthly minimum fee is $100, $500, $1,000, or an other amount. The monthly minimum is based on a per user ID basis, a per fund basis, and/or a per financial institution basis. Optionally, the monthly fee is based on the size of the financial institution, the number of accounts, and/or other factors. Optionally, the monthly minimum varies depending on whether the server 106 (FIG. 1) provide financial transactions for the financial institution. For example, the monthly minimum fee is $500 if the server 106 provide financial transactions and responds to inquiries and $0 if the server just responds to inquiries.

Discounts may be provided for any type of fee or for any combination of fees. Minimum and maximum fees may be assessed for any type of fee or combination of fees. The fees for any type of fee may be graduated. The graduated fees can increase or decrease as the use of the server increases. Preferably, the fees are charged to the financial institution being accessed. However, in the alternative, the user or a third party is charged.

Figure 6:
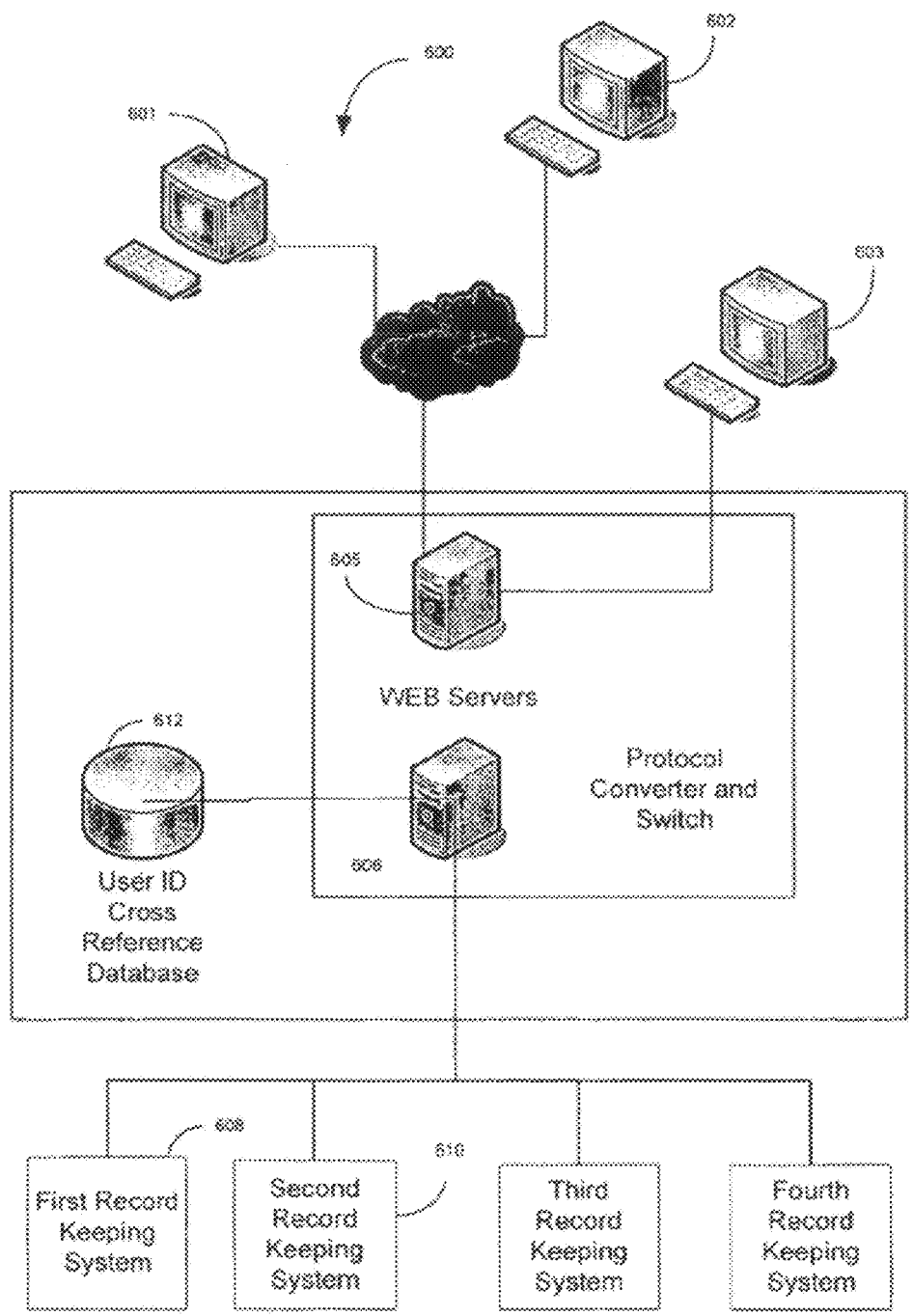
FIG. 6 is a representation of an embodiment of a system for accessing financial information.

FIG. 6 is another representation of an embodiment of a system 600 for accessing and presenting financial information. The system 600 includes a plurality of computers 601, 602, 603, each running a standard WEB browser or other communication program for accessing the server 605. Each computer 601, 602, or 603 comprises a personal computer, terminal, laptop, palmtop, mainframe, or other device capable of communicating with the server 605. The computers 601, 602, 603 access the server 605 via an intranet or other network, such as the Internet, or via a direct communication line. The server 605 communicates with the computers 601-603 and a plurality of record-keeping systems, for example, the first record-keeping system 608 and the second record-keeping system 610. The computers 601-603 may execute an application for communicating with the server 605. The server 605 may execute an application or group of applications for communicating with the computers 601-603 and the first and second record-keeping systems 608, 610.

According to one aspect, the first and second record-keeping systems 608, 610 are owned by different entities, such as fund companies. The server 605 may be owned by the same entity that owns one of the first and second record-keeping systems 608, 610.

The records stored in the first and second record-keeping systems 608, 610 are stored in different formats, but a same format may be used. The record-keeping systems 608, 610 have different or the same data structures, and/or operating systems. The record-keeping systems 608, 610 are controlled by a data warehouse company that maintains the data for a financial institution, or the financial institutions.

The records stored in the first and second record-keeping systems 608, 610 include account information, such as mutual fund accounts, annuities, and other financial information, and fund information, such as yield to date, net asset value.

A user at a computer 601, 602, 603 accesses the information stored on the first and second record-keeping systems 608, 610 through the server 605. It is preferred that the users include financial intermediaries. The server 605 maintains several databases that track relationships. The relationships are stored in tables, database, flat files, or with other mechanisms. These databases include the user ID and password used for user authentication or log-on. The databases include the relationship between the user ID and record-keeping systems user IDs. For example, a user signs-on to the system 600 using a user ID and password. When that user accesses a record-keeping system 608, 610, the server 605 determines an internal ID for the record-keeping system 608, 610 associated with the user ID and password. In an alternative embodiment, the server 105 determines an ID and password for the record-keeping system associated with the user ID and password used to sign-on to the system 600. The server 605 sends a request for information to the record-keeping system with the a user ID, which is the system user ID or the internal user ID. Thus, a user need only remember the user ID and password for signing-on to the server 605, and need not know the user IDs for the record-keeping systems. Each record-keeping system may know the user by a different internal user ID or use the same user ID as the server 605.

The server 605 also maintains the relationships between the system user ID and the financial companies that the user can access. For example, after a user logs-on to the server 605 with a user ID and password, a list of fund families is presented. The list includes the funds that user is allowed to access. In one aspect, the list includes just the funds accessible to the user. Fund families also comprise fund companies, mutual fund companies, financial institutions, and management companies. The list of authorized fund families is based on the relationships stored in the database.

The server 605 also maintains a routing table. The routing table includes the relationship between the fund companies and the record-keeping system where their financial data is stored. Financial data includes account data and fund data. For example, when the server 605 receives an inquiry for fund information, the server 605 determines which record-keeping company has the data for that fund. A request is then transmitted to that record-keeping company. In a preferred embodiment, the record-keeping systems 608, 610 are directly connected with the server 605, and the routing includes port identifications, where each record-keeping system is associated with a port.

Financial intermediaries are often associated with dealer, branch, and representative identifiers. The record-keeping system may maintain the relationships between user ID and dealer, broker, and representative. The user ID may be the user ID used to log-on to the server or the internal user ID assigned by a record-keeping system.

Alternatively, the server 605 maintains relationships between a user's user ID and the dealer, branch, and representative associated with the user ID. The dealer, branch, and representative are provided to the record-keeping system in a request for information or a request for a transaction.

The server 605 dynamically builds the HTML pages that are sent to the clients' browsers. The server 605 decodes a request from a client's browser into a transaction request and forwards the request to the Protocol Converter and Switch 606. The switch 606 determines, by referring to the cross-reference database 612, which record-keeping system has the requested data. The switch 606 translates and forwards the request into a format and protocol that the target record-keeping system supports and forwards the request to the target record-keeping system for processing. Once the record-keeping system has satisfied the request, it sends a response to the switch 606. The switch 606 converts the response into a transaction response and sends the response to the server 605. The server 605 decodes the transaction response and dynamically builds the HTML pages to be delivered and displayed in the client's browser. The switch 606 handles data translations, for example between ASCII and EBCDIC.

Figure 7:
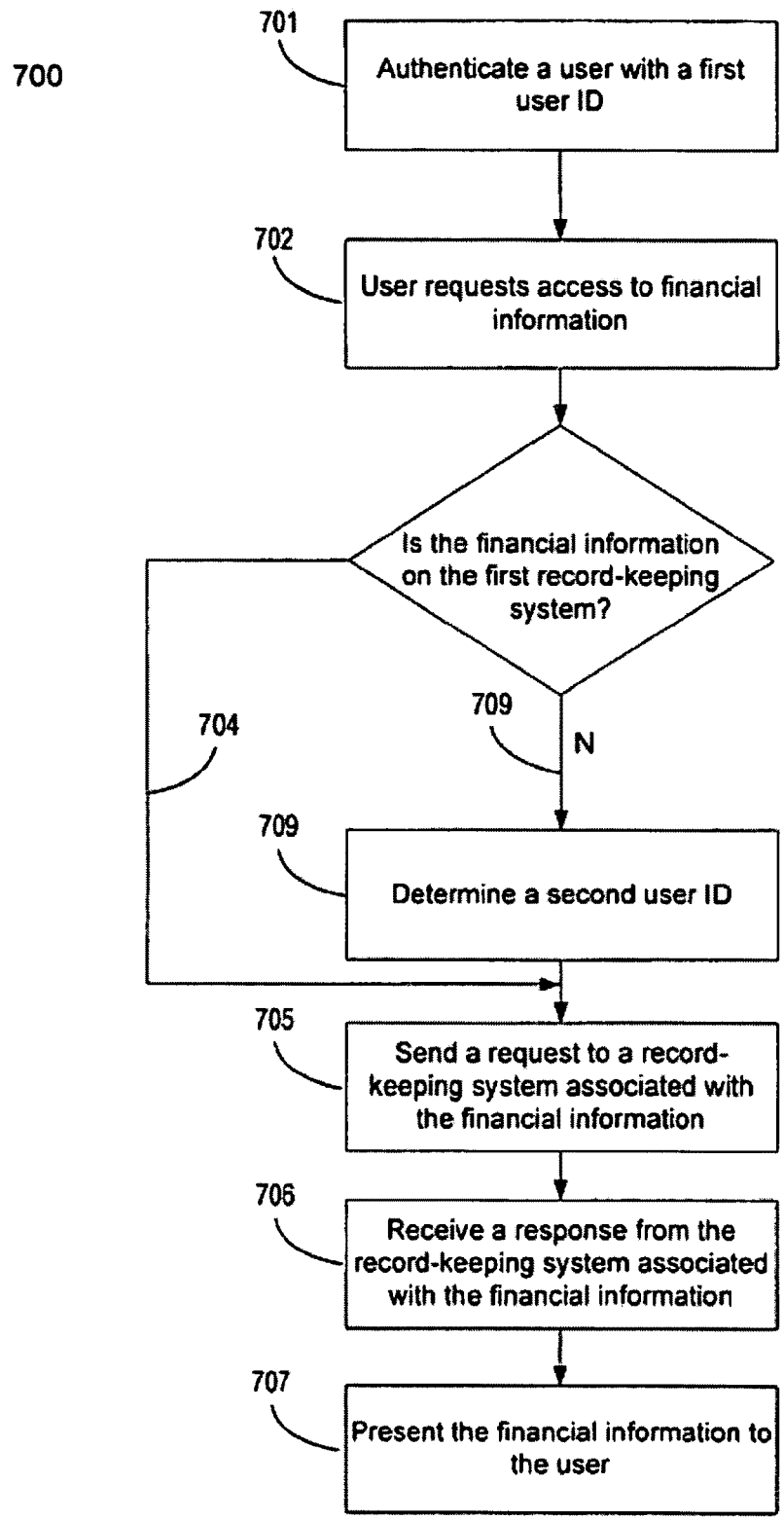
FIG. 7 is a representation of an embodiment of a method of accessing financial information.
Figure 8A:
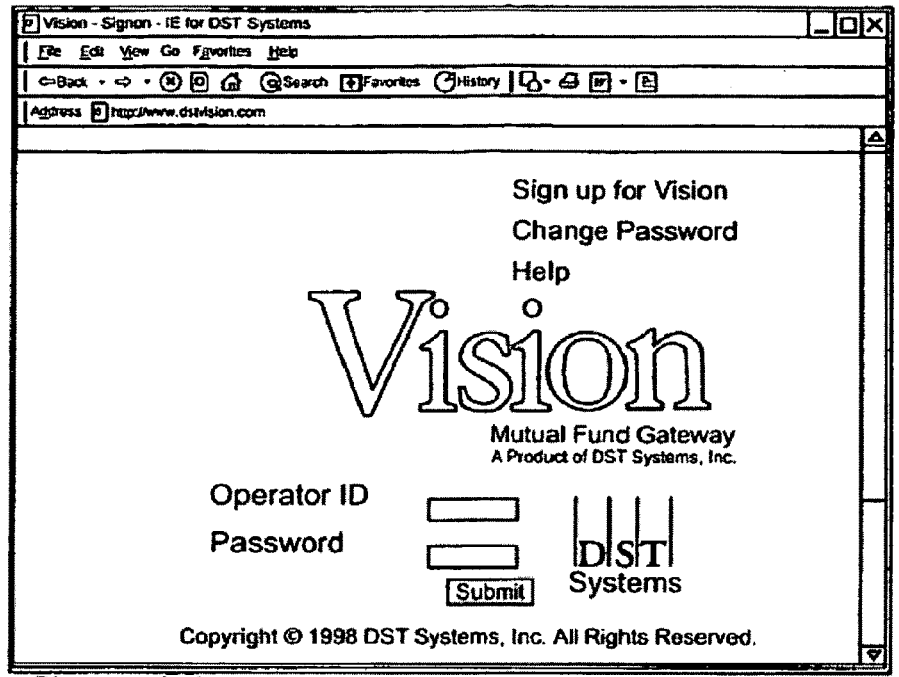
FIG. 8(a) is a representation of an embodiment of a screen for signing-on to the system of FIG. 1.
Figure 8B:
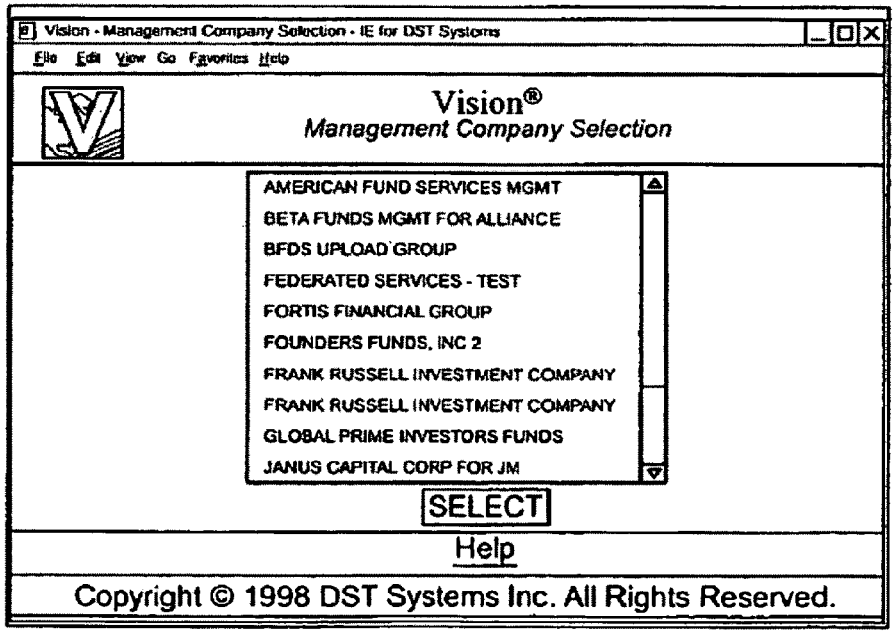
FIG. 8(b) is a representation of an embodiment of a screen with a list of financial institutions that a user may access.
Figures 8C, 8D:
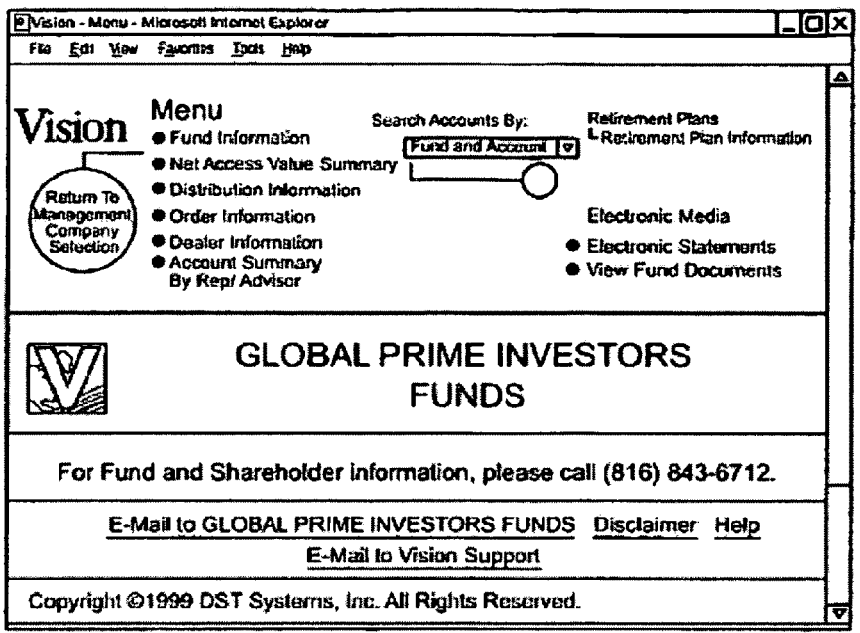
FIG. 8(c) is a representation of an embodiment of a financial institution menu window.
FIG. 8(d) is a representation of an embodiment of a shareholder account history.

Referring now to FIG. 7, a flow diagram 700 of the method of accessing specific information associated with a financial institution is shown. When a user signs-on to the system of FIG. 1, the server 105 sends the first user ID and password for authentication in act 701. The first user ID may be the Vision ID according to one embodiment. FIG. 8(*a*) shows a sign-on window according to one embodiment. The system is secured by a user ID, which can be restricted at dealer, dealer/branch, and dealer representative access levels or by a tax ID. The type of security associated with a user ID will affect the account information displayed on computers 601, 602, and 603. The password is encrypted and compared against the encrypted password.

After password authentication, a list of financial institutions that the user is authorized to access is presented to the user. The list of authorized financial institutions is determined by referring to a cross-reference database maintained within a data base, such as the User ID Cross-reference Database 612 (FIG. 6). FIG. 8(*b*) shows an example of a list of financial institutions from which the user may access financial information. To add additional financial institutions, the user may click the "Sign up for Vision" hyperlink on FIG. 8(*a*) to go to Vision enrollment WEB site.

In act 702 (FIG. 7), the user selects one of the financial institutions from the displayed list to request specific financial information. The switch 606 determines in act 703 whether the requested financial information is on the first record-keeping system. The switch 606 refers to the cross-reference database of financial institutions to the user ID maintained in the User ID Cross Reference Database 612 (FIG. 6).

If the selected fund is on the first record-keeping system 704, the server 605 sends in act 705 a request to the first record-keeping system. This request includes a first identification code, which may be the system user ID. The server 605 then receives in act 706 a response from the first record-keeping system. The server 605 presents in act 707 the response to the user, via e-mail, fax, or postal mail.

If, however, the requested financial information is on the second record-keeping system 708, the request for specific information received from the user is sent from the server 605 to the switch 606. In act 709, the switch 606 determines an internal identification code from the cross-reference database if one has been assigned to the user. In act 705 the switch routes the request to the second record-keeping system. The request includes the second identification code. The second identification code includes the internal identification code or the first identification code. In act 706 the server 605 then receives a response from the second record-keeping system. The server 605 presents in act 707 a portion of the response to the user.

FIG. 8(*c*) shows a financial institution menu window for Global Prime Investor Funds, which the user may select from the list in FIG. 8(*b*) in one embodiment. This window provides options for accessing detailed information about the Fund Company. FIG. 8(*d*) shows a "Shareholder Account History" screen displaying transaction history information for an account within the funds. Vision provides real-time, up-to-date fund and shareholder account information.

Communications between the server 605 and the record-keeping systems 608, 600 are via messages. The messages have a unique identifier name and may have a method to match responses with the corresponding requests. Each message, being a request or a response to a request, comprises a header portion and a data portion. For example, for accessing an Account History, the header and account history request data are sent to the record-keeping system associated with the financial information. In the response from the record-keeping system, the header and account history response data will be returned.

FIG. 9 shows an example of a header record 900 according to one embodiment. This header is sent with a request or response message. The header includes one or more:

(1) length fields that indicate the length of the message (packet) and/or the length of data portion 901;

(2) a transaction ID 902, for example ACCTHIST@VISION for the Account History request, that indicates a transaction to be performed;

(3) the source of the a message 903;

(4) a source tag 904, which should be returned in the response header;

(5) the user ID 905 used to sign-on to the system or the internal user ID assigned by the second financial institution; and (6) error messages 906 used by the target system to indicate which error occurred.

FIG. 10 shows a list of error messages, which include error codes indicating whether:

(1) a severe system error has occurred 1001;

(2) files are unavailable for read access 1002;

(3) the user ID is not authorized 1003; and (4) the target fund or the system is unavailable to process the request 1004.

Other fields and/or messages may be used.

The data portion of a request defines the specific information the user is desiring to access. The data portion of request messages and response messages may be fixed or variable length. An exemplary list of a DST request data portion in the Vision system is described on pages 34-133 of Appendix B.

FIG. 11 shows one embodiment of a data portion of a fixed length transaction message 600 for requesting an account history. The request data 1100 includes:

(1) a first field 1101 for identifying the selected fund;

(2) a second field 1102 for identifying a shareholder account; and (3) a third field 1103 for indicating an index for requesting additional accounts.

Other fields and/or messages may be used.

FIG. 12 shows an example definition of a data portion of a response message 1200 sent by a record-keeping system in response to an account history request. The data portion 1200 includes various fields:

(1) optionally, the type of transaction 1201;

(2) the number of shares 1202;

(3) the amount of the transaction 1203, preferably in dollars;

(4) the cumulative share balance of an account 1204;

(5) the date of the transaction 1205; and (6) a transaction description 1206.

Other fields and/or messages may be used.

According to another aspect of the present invention a method of enrolling a user for accessing financial information from a financial institution is presented. A user requesting access to financial information associated with a financial institution accesses an online sign-up. The sign-up procedure generates a user ID setup request e-mail that is automatically sent to the service provider. Upon receipt, the service provider forwards an authorization request to the appropriate financial institution(s) for approval. This request contains the pertinent information needed to verify the operator's request and the user ID. Other sign-up procedures may be used, such as in response to written or voice instruction.

The financial institution replies to the request. The financial institution may choose to provide its own user ID; however, if none is provided, the system user ID is used. If the financial institution chooses to provide its own user ID, this ID will be maintained on the cross-reference database 612 (FIG. 6). Thus a user is able to sign-on to the system with one user ID and password to access many accounts.

Figure 13:
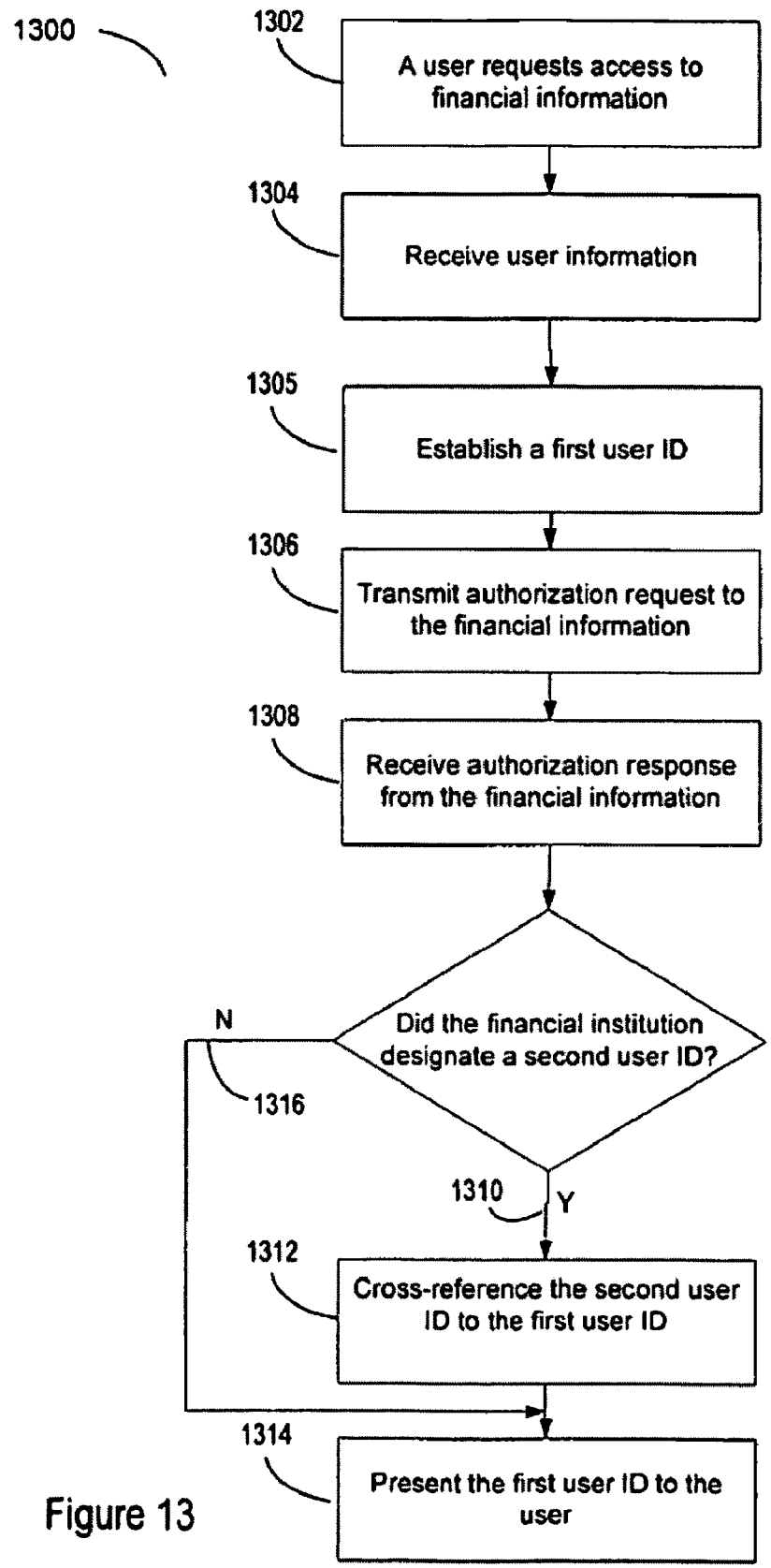
FIG. 13 is a representation of an embodiment of a method of enrolling a user for accessing a financial institution.
Figure 14A:
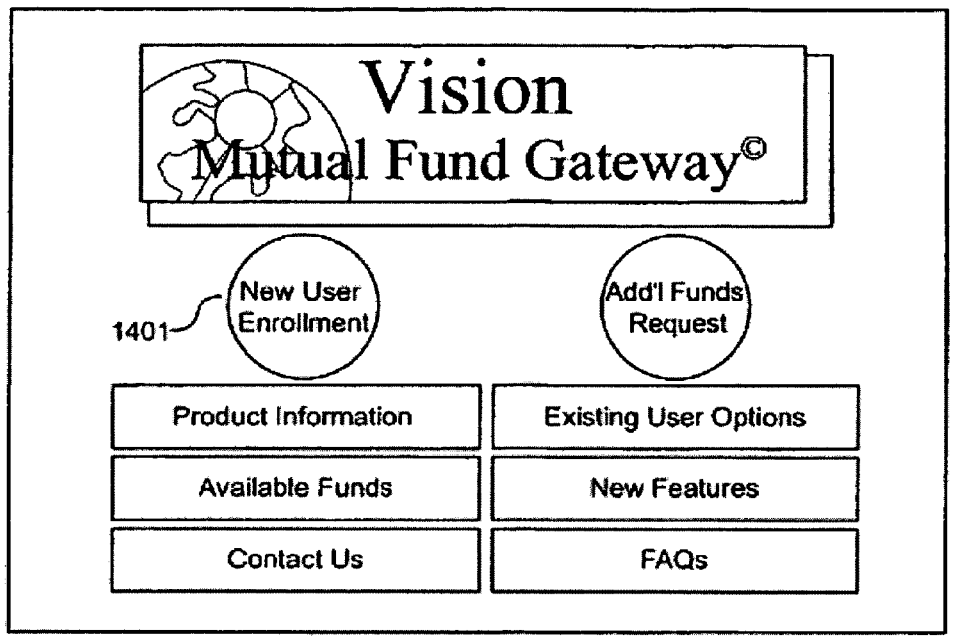
Figure 14B:
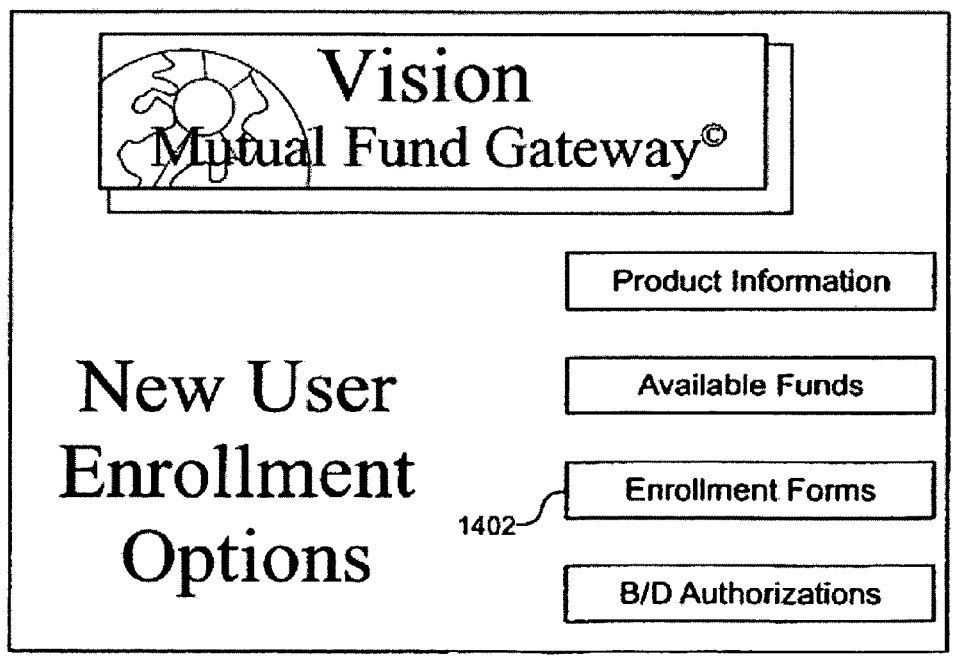
Figure 14C:
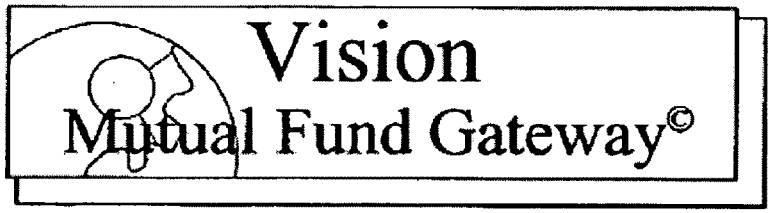
Figure 14D:
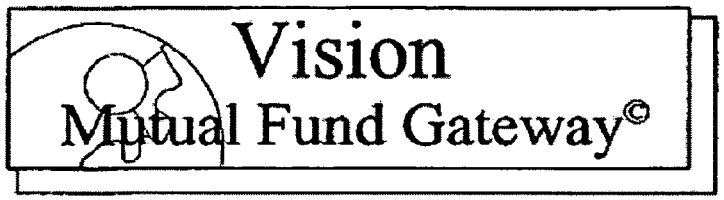
Figure 15B:
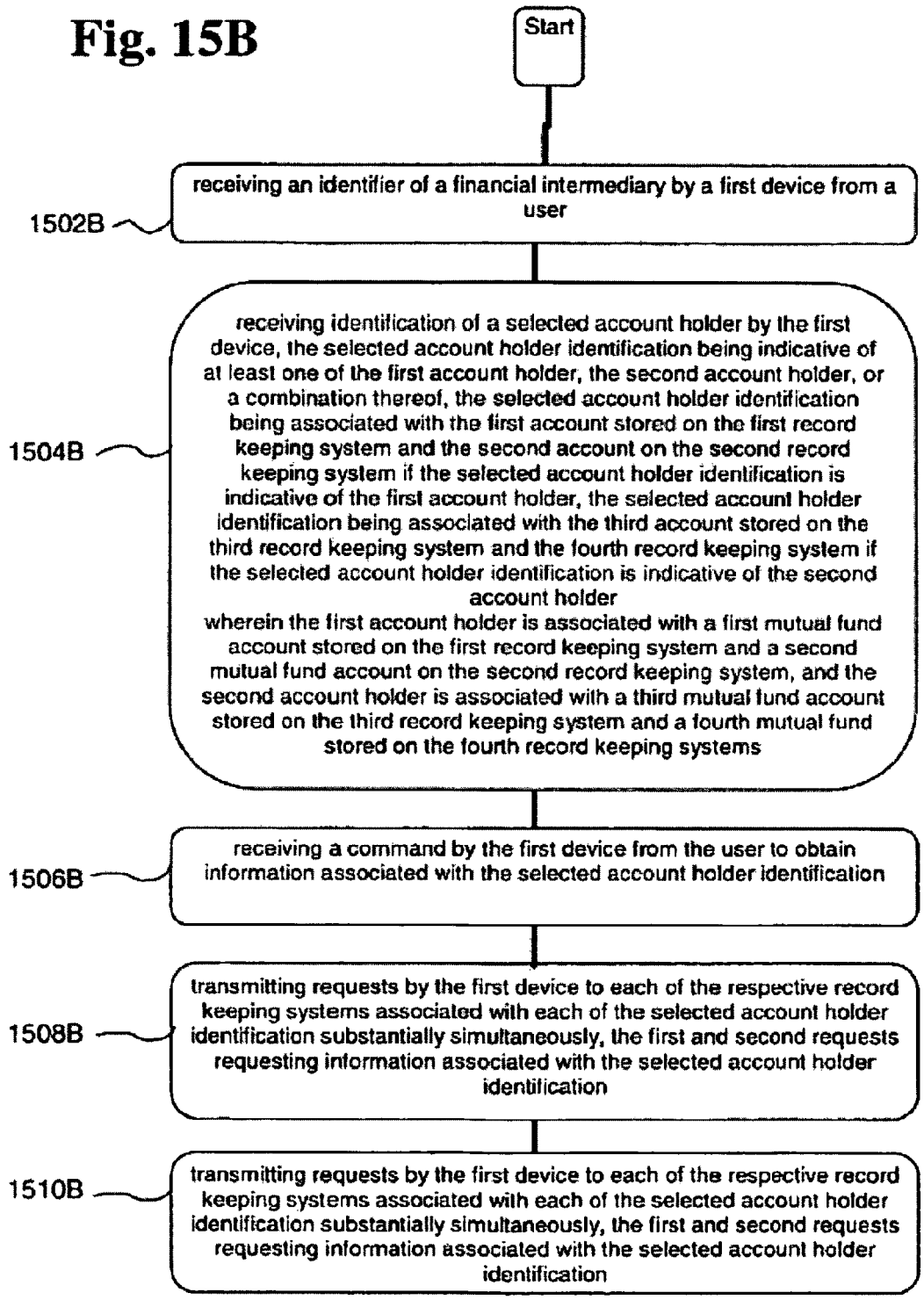
Figure 15C:
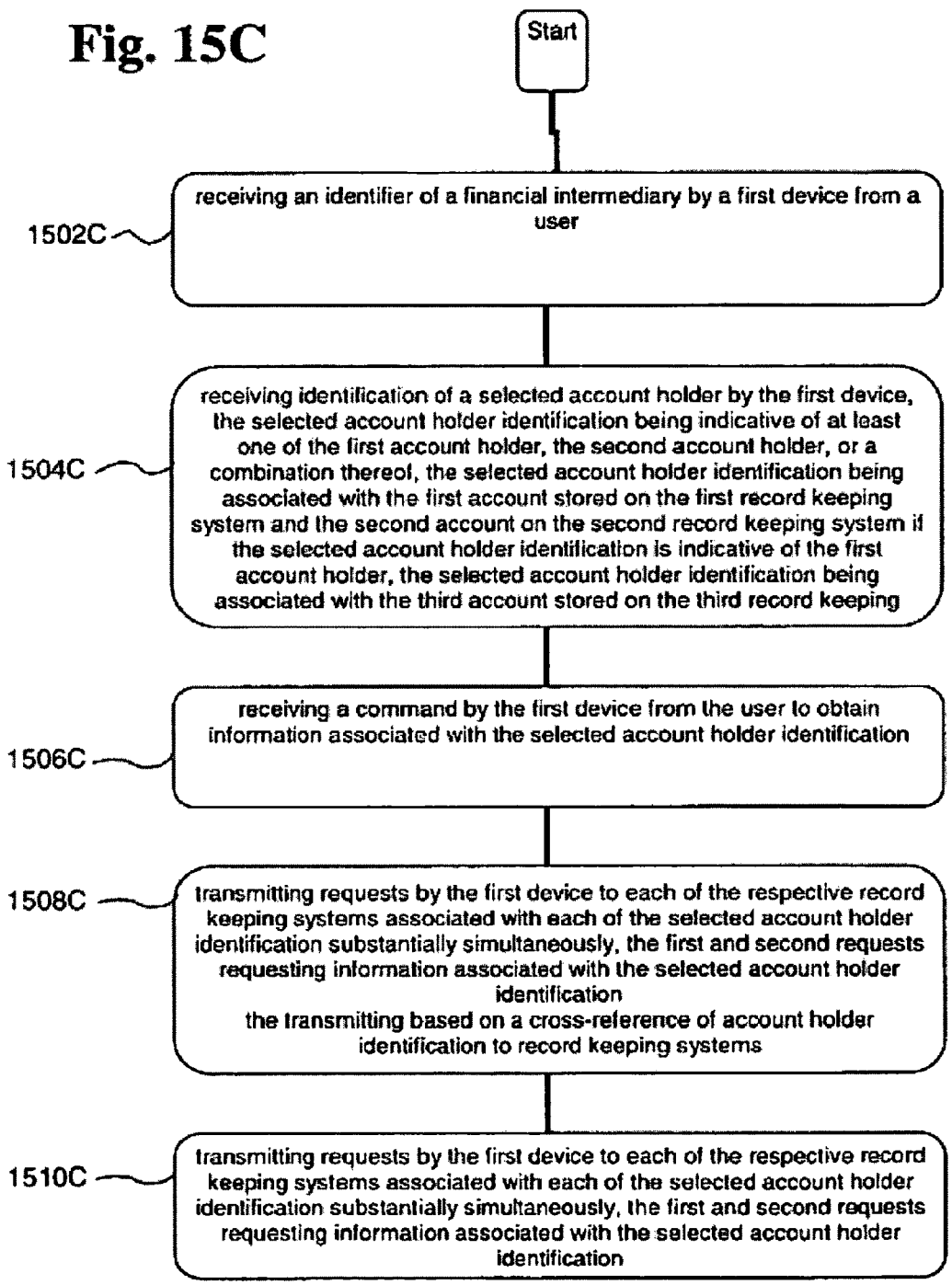
Figure 15D:
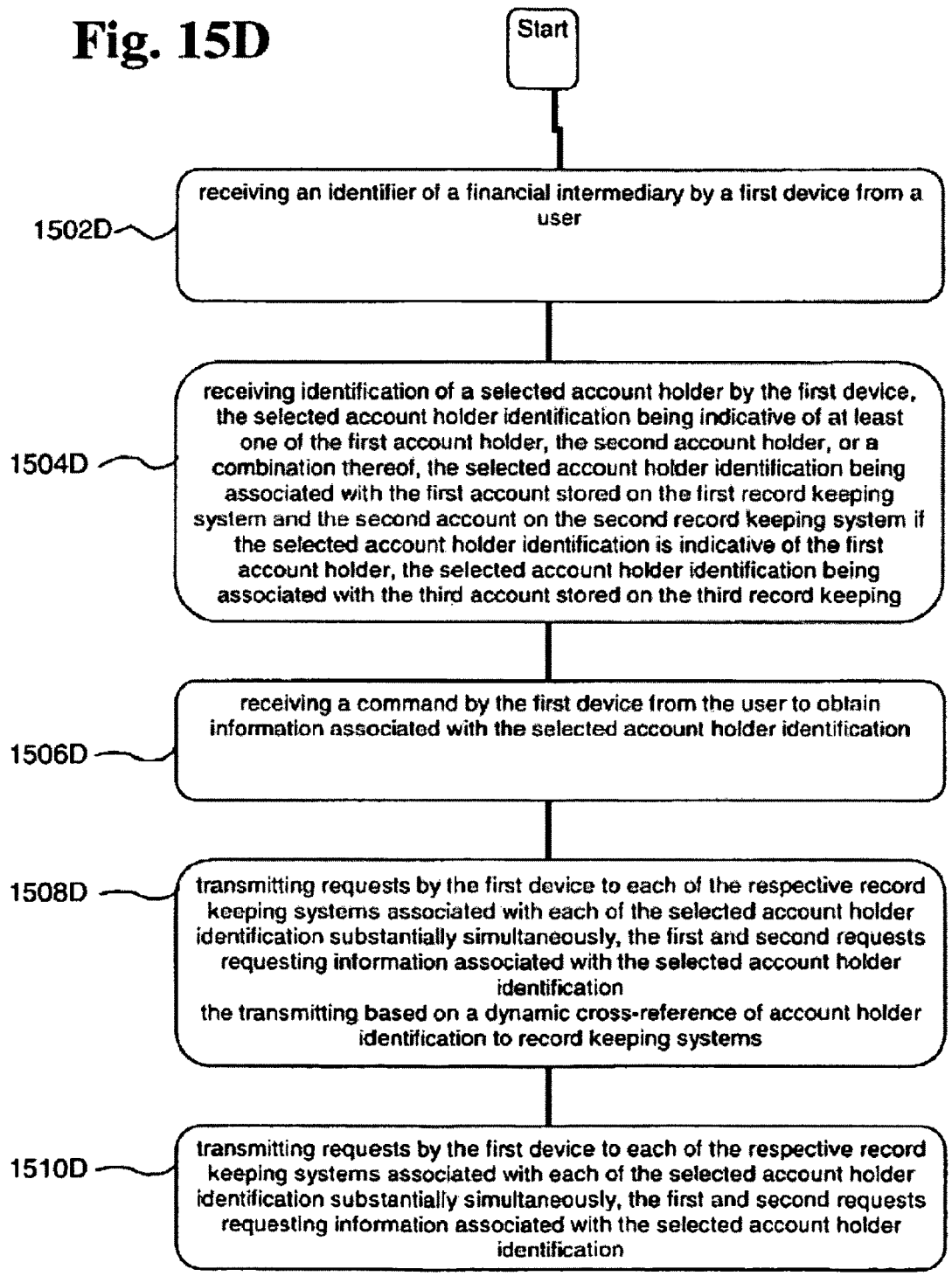
Figure 15E:
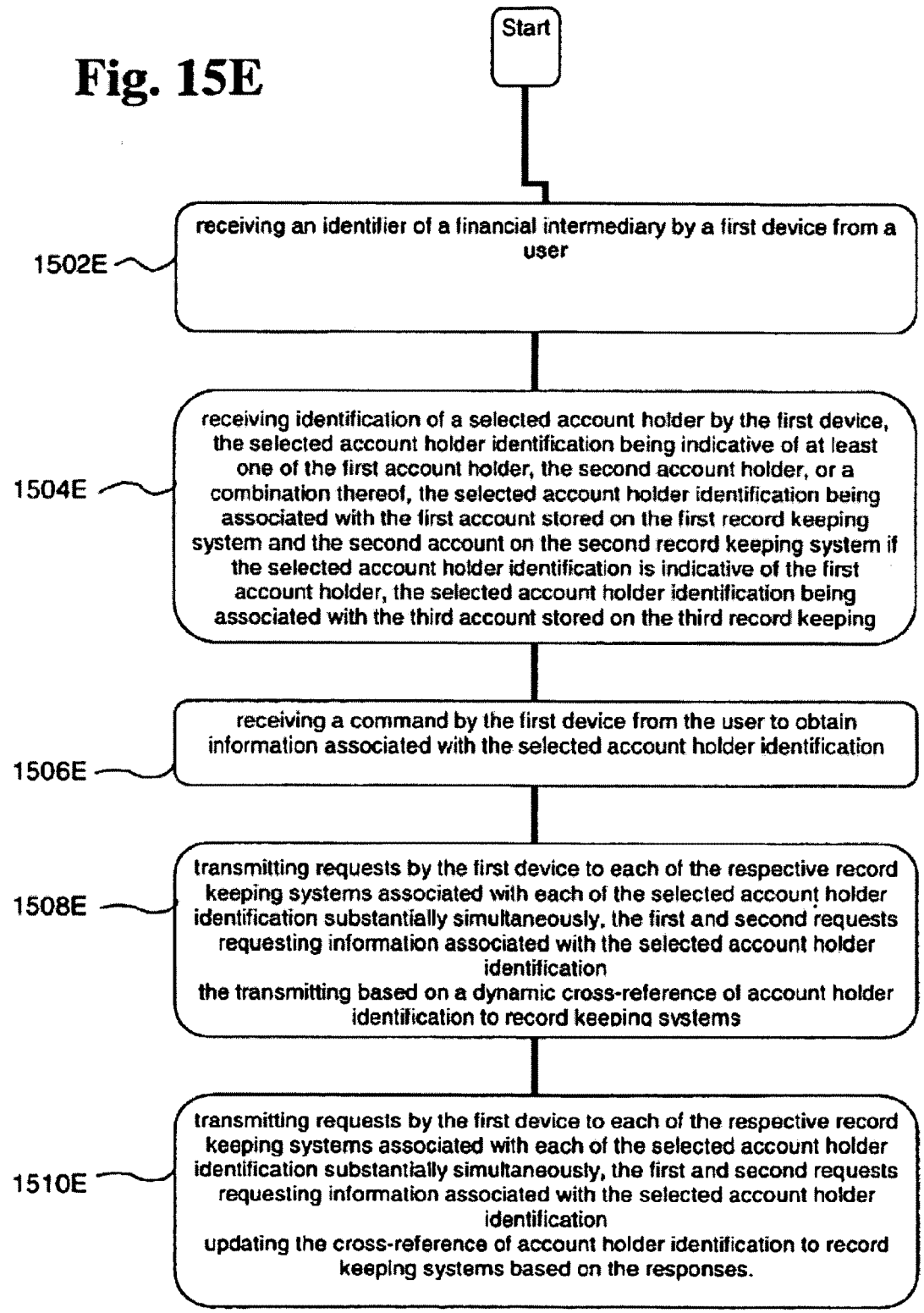
Figure 15F:
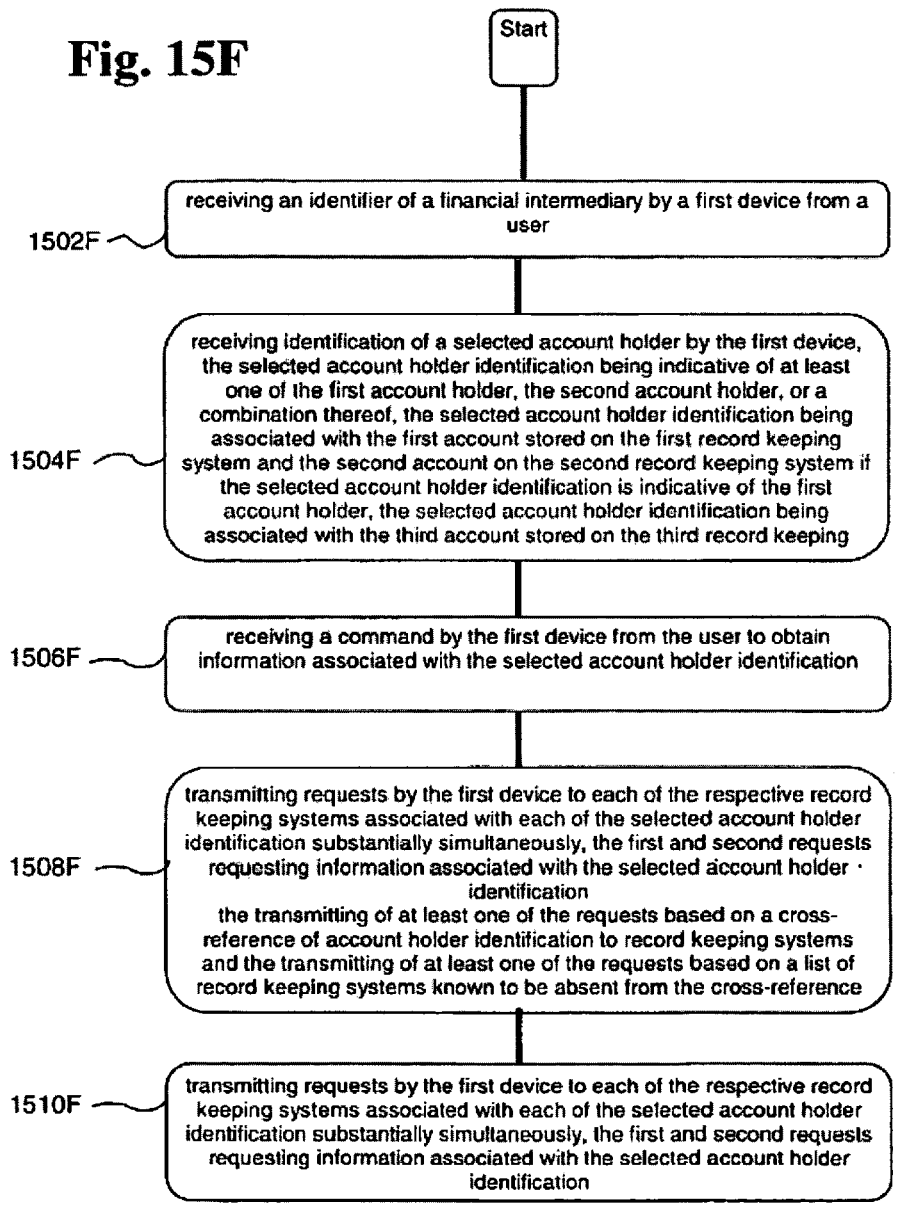
Figure 15G:
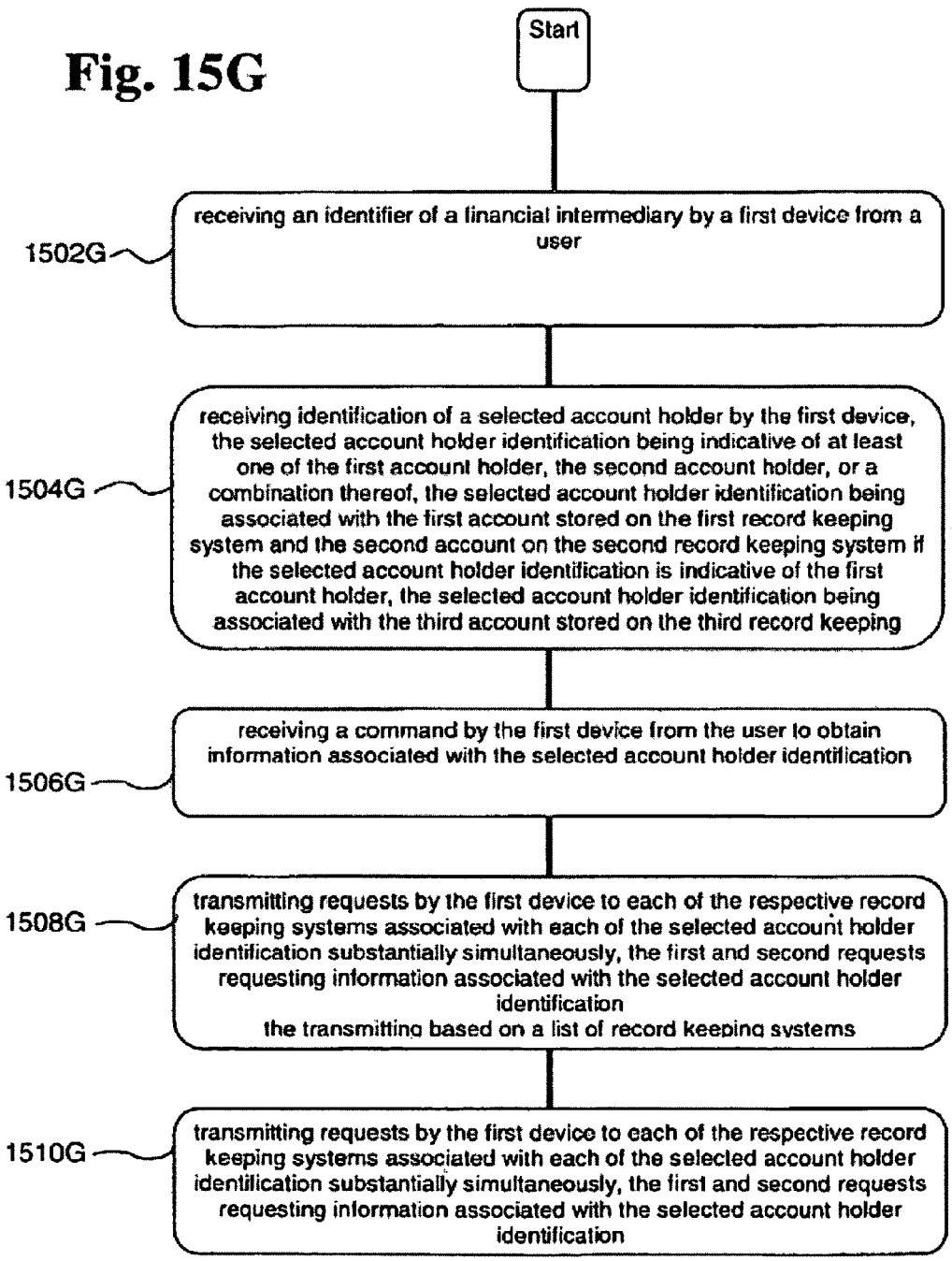
Figure 15H:
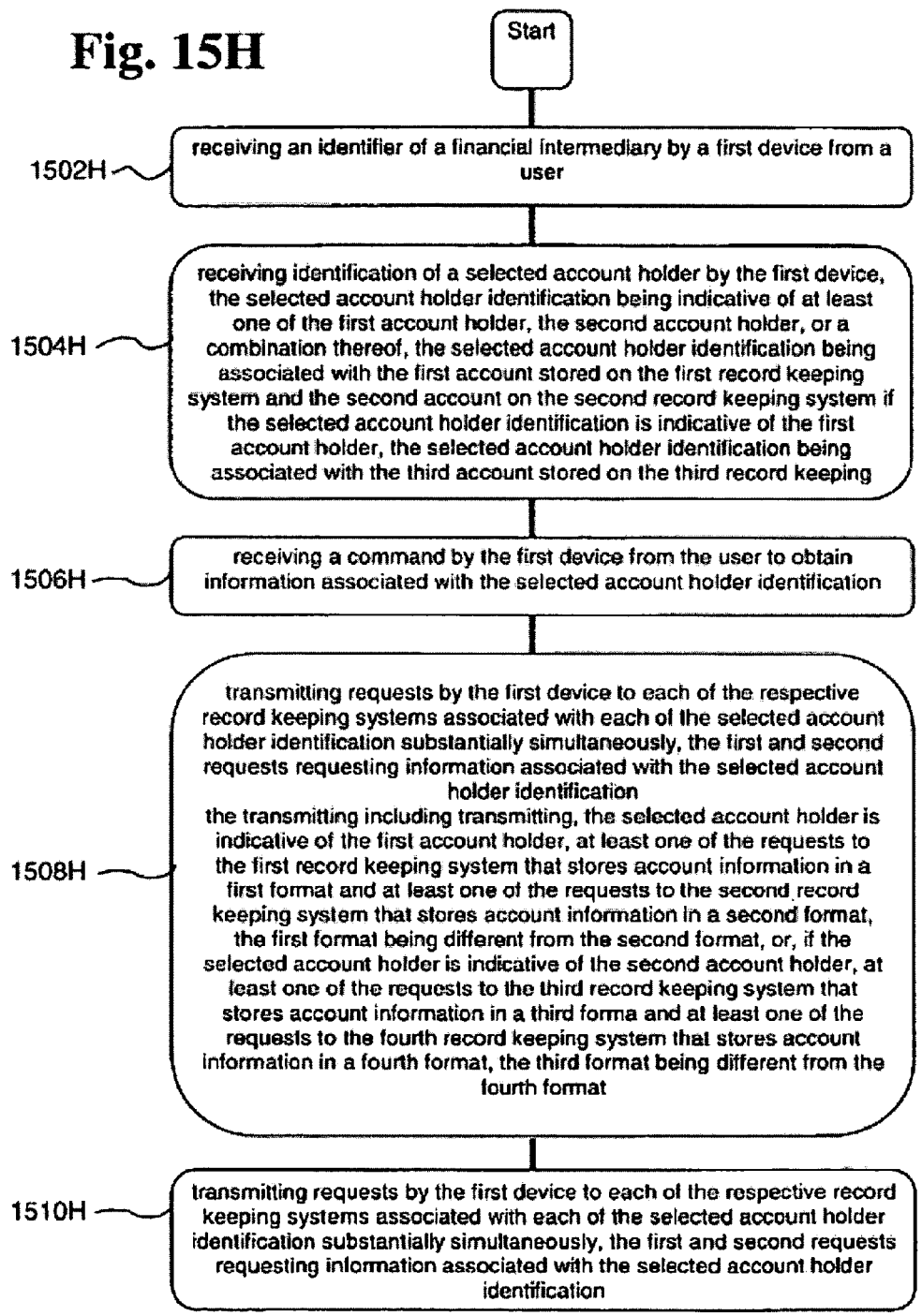
Figure 15J:
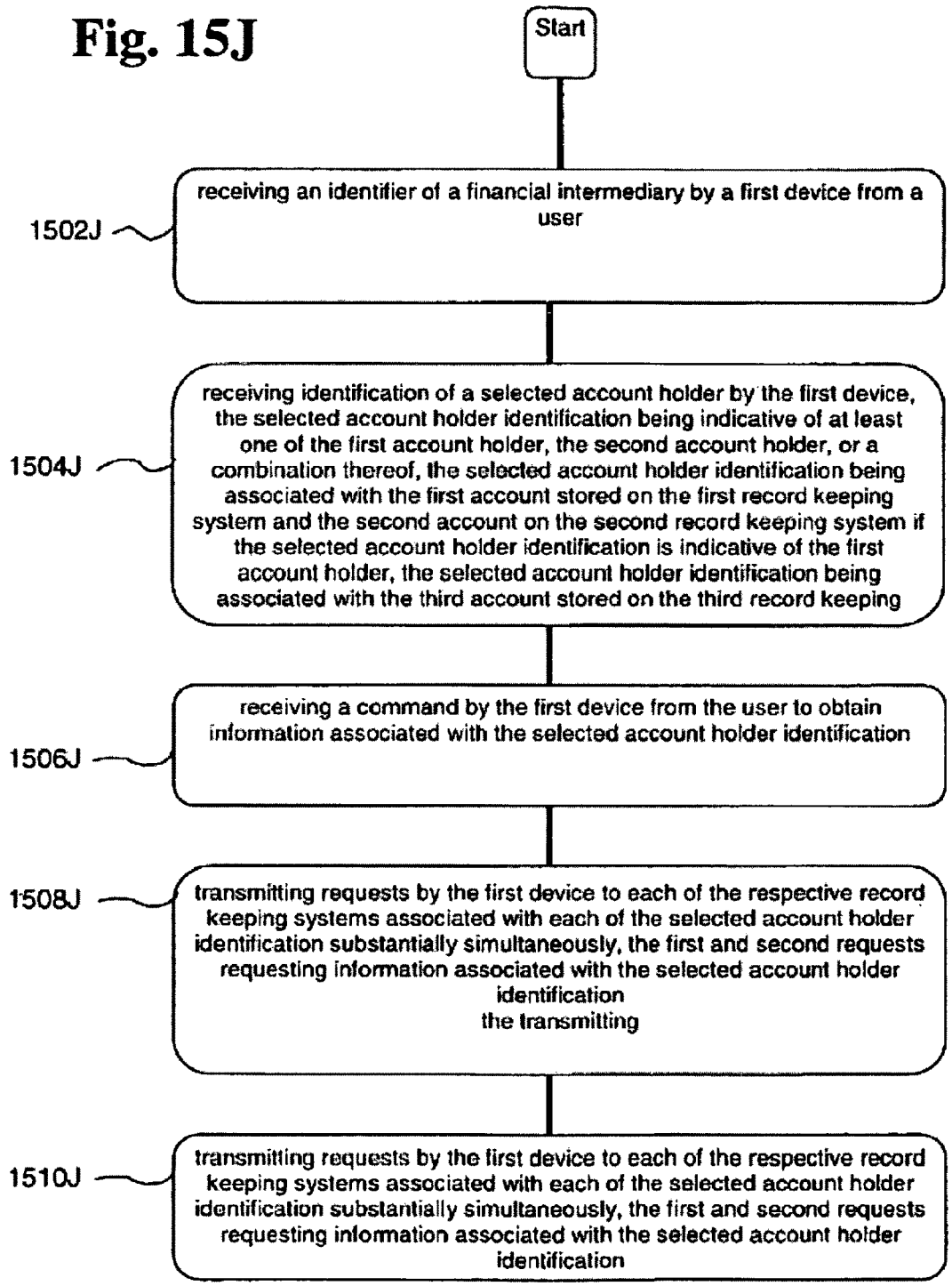
Figure 15L:
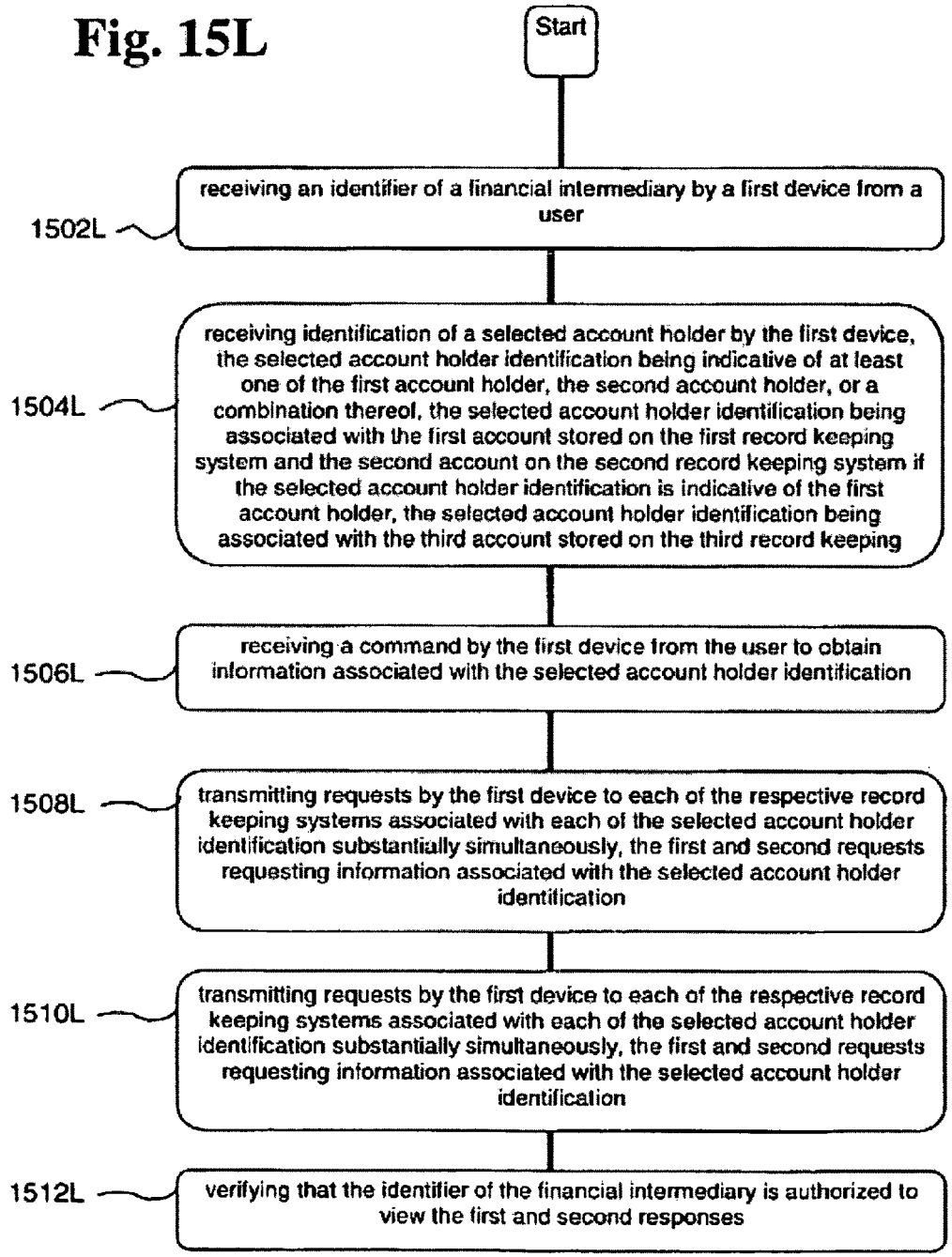

FIG. 13 shows one embodiment of a flow diagram 1300 of the enrollment process. In act 1302 a user requests access to financial information. In act 1304, the user is requested to provide certain information to the system 600 in FIG. 6. The user information may be received via a standard client WEB browser running on one of the computers 601-603, via phone, via e-mail, or via postal mail.

FIG. 14(*a*) shows a screen for a new user enrollment or for adding additional funds to the list of authorized funds for an existing user, according to one embodiment. FIG. 14(*b*) shows the new user window after the user has selected the icon labeled "New User Enrollment" 1401 in FIG. 14(*a*). When the user clicks on the icon "Enrollment Forms" 1402, the enrollment form, as shown in FIG. 14(*c*), appears. This form allows the user to select one or more of the access levels 1403-1406. The access levels include dealer level, branch level, representative level, and Tax ID level. FIGS. 14(*d*)-14(*f*) show the windows for providing user information when the user selects the respective access levels 1403-1406.

In act 1305 (FIG. 13), the server 605 establishes a first user ID and password for the user based on the user information. The first user ID has a unique association with each individual financial institution or fund company that has been authorized for the user. This association allows the Fund Company's name to be listed on the main entry window or display after the user signs-on. The server 605 supplies the first user ID to the selected financial institution so that the financial institution applies the appropriate security and access control. Several different types of intermediaries use the system 600, so the system 600 supports different levels of account access. Preferably, accounts linked to the user are accessible with a single log-on.

In act 1306 the switch 606 translates the request into a format and protocol that the financial institution supports and forwards the translated request to the target financial institution. The financial institution processes the request and may authorize the user to access financial information, may decline access to financial information, may indicate that information supplied from the user is not correct, or may modify the user-specified access levels for accessing the target record-keeping system. The switch 606 receives the access authorization information from the financial institution in act 1308, converts the response into a system transaction response, and sends the converted response to the server 605. The server 605 decodes the transaction response.

In optional act 1310 the target financial institution assigns an internal user ID for the user. The server 605 cross-references the system user ID with the internally designated user ID in a database 612 (FIG. 6) in act 1312, such that the user just needs to know the system user ID when accessing the financial information from financial institutions associated with both first and second record-keeping systems. If, however, the financial institution chose not to assign an internal user ID 1316, the server 605 provides the system user ID to the user in act 1314, and the system user ID is used for future access of the financial institution associated with both the first and second record-keeping systems. The user uses one user ID and password to access both financial institutions, such as accessing TA2000® and non-TA2000 financial institutions with the same user ID and password An example of the enrollment process discussed above for the Vision system is as follows. The DST receives a request from representative, Sarah Williams, for Vision access to the ABC financial institution, which is a non-TA2000 system. The DST sends the request to the ABC financial institution, and references Sarah's DST-assigned Vision User ID "VS00001693." The ABC financial institution chooses to assign Sarah an internal user ID "ABC0000067." DST cross-references these two IDs in the cross-reference database 612 (FIG. 6).

When Sarah Williams desires to access a specific financial information from the ABC financial institution, Sarah signs on to the Vision system 100, through the window shown in FIG. 8(*a*), with the DST assigned Vision user ID "VS00001693." As mentioned above, this Vision user ID provides Sarah automatic access to the ABC (non-TA2000) financial institution, by means of the cross-reference database 612 (FIG. 6).

In another example, when the DST receives a request from Sarah for Vision access to the XYZ financial institution, which is also a non-TA2000 system, the DST sends Sarah's request to the XYZ financial institution, and references Sarah's DST-assigned Vision User ID "VS00001693." However, the XYZ financial institution chooses not to assign Sarah an internal user ID. The switch 606 (FIG. 6) uses Vision User ID "VS00001693" for accessing the XYZ financial institution. When Sarah desires to access specific financial information from the XYZ financial institution, Sarah signs-on to the Vision system 600 (FIG. 6) with the DST-assigned Vision User ID "VS00001693." As mentioned above, this Vision ID provides Sarah direct access to financial information from the XYZ (non-TA2000) financial institution. The authorization request, which is sent to a target financial institution, includes the user ID and the user information entered by the user, through the windows shown in FIGS. 14(*c*)-14(*f*), in one embodiment, such as the user's name, address, phone number, and the user-demanded access levels.

The authorization response includes the user ID, access information, and the internal user ID. The access information may either include information confirming the access levels that the user had demanded, or information modifying the user-demanded access levels. For example, if the user had demanded a dealer number 123 and a representative number 345, the target financial institution may approve the dealer number 123, but may change the representative number to 678.

The following appendices are hereby incorporated by reference: Appendix A, entitled "Vision Mutual Fund Gateway Training Guides" and Appendix B, entitled "Vision Mutual Fund Gateway External Funds Technical Manuals."

While the examples provided above have mutual fund companies as the financial institutions, the invention is applicable to other financial institutions such as those that deal with annuities, variable annuities, bank accounts, credit accounts, and bond funds.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

What is claimed is:

1. A method of accessing substantially real-time financial information of account holders in a computer implemented system, the substantially real-time financial information describing at least two different accounts of each of at least two different account holders, each of the at least two different accounts being stored on a different record keeping system, the method comprising:
   (a) receiving, from a user, identification of a selected account holder by an access device, the selected account holder identification being indicative of at least one of the at least two account holders;
   (b) determining, by the access device, the different record keeping systems which store the at least two different accounts associated with the selected account holder identification;
   (c) transmitting, in response to the determining, requests by the access device to each of the determined different record keeping systems substantially simultaneously, the requests requesting therefrom, information associated with at least the stored one of the at least two different accounts of at least one of the at least two account holders indicated by the selected account holder identification; and
   (d) receiving responses by the access device from the determined different record keeping systems in response to the requests, the responses including substantially real-time financial information associated with the at least the stored one of the at least two different accounts of at least one of the at least two account holders indicated by the selected account holder identification.

2. The method of claim 1, wherein the determining further comprises accessing a database to identify a cross-reference between the selected account holder identification and the different record keeping systems storing at least one of the at least two accounts associated with the at least one of the at least two account holders identified by the selected account holder identification.

3. The method of claim 2, wherein the transmitting further includes transmitting requests by the access device to all of the different record keeping systems substantially simultaneously when the accessing fails to identify any cross-reference.

4. The method of claim 3, wherein the receiving further comprises creating a cross-reference in the database between the selected account holder identification and each of the different record keeping systems which respond with the requested substantially real-time financial information associated with the selected account holder identification and not creating a cross-reference in the database between the selected account holder identification and each of the different record keeping systems which respond otherwise.

5. The method of claim 2, wherein the receiving further comprises updating the cross-reference in the database between the selected account holder identification and each of the different record keeping systems based on the responses therefrom.

6. The method of claim 2, wherein the cross-reference between the selected account holder identification and the different record keeping systems, which store each of the at least two accounts associated with the at least one of the at least two account holders identified by the selected account holder identification, is created upon enrollment of the at least one of the at least two account holders identified by the selected account holder identification.

7. The method of claim 2, wherein the determining further comprises accessing a list of record keeping systems not cross referenced in the database.

8. The method of claim 1 wherein the determining further comprises determining a record keeping system specific account holder identifier associated with each of the determined different record keeping systems, each request including the associated determined record keeping specific account holder identifier.

9. The method of claim 8, wherein the record keeping specific account holder identifier comprises an account number.

10. The method of claim 8, wherein the record keeping specific account holder identifier comprises a password.

11. The method of claim 8 further comprising:
(e) receiving a user specific identifier from the user prior to receiving the selected account holder identification, the user specific identifier being different from each of the determined record keeping system specific account holder identifiers.

12. The method of claim 8 wherein each of the requests further include the user specific identifier.

13. The method of claim 1, wherein the determining further comprises determining a record keeping system specific request format associated with each of the determined different record keeping systems, each request being formatted based on the associated determined record keeping specific request format.

14. The method of claim 1, wherein the request comprises a request for the status of the at least the stored one of the at least two different accounts of at least one of the at least two account holders indicated by the selected account holder identification.

15. The method of claim 1 further including:
(e) presenting portions of the responses contemporaneously.

16. The method of claim 1 further comprising:
(e) verifying that an identifier of the user indicates that the user is authorized to view the responses.

17. The method of claim 1 further comprising:
(e) receiving, from the user, a user specific identifier;
(f) identifying a subset of the at least two different account holders associated with the user specific identifier;
(g) comparing the subset with the selected account holder identification; and
(h) performing the determining and transmitting only where the at least one of the at least two account holders identified by the selected account holder identification is also identified in the subset.

18. The method of claim 1 further comprising:
(e) receiving, from the user, a user specific identifier;
(f) identifying a subset of the at least two different account holders associated with the user specific identifier;
(g) presenting the subset to the user; and
wherein the receiving of the identification of the selected account holder further comprises permitting the user to select from the presented subset to provide the selected account holder identification.

19. The method of claim 1 further comprising:
(e) charging a fee based on the performance of the transmitting and receiving.

20. The method of claim 19 wherein the fee is based on the number of requests.

21. The method of claim 19 wherein the fee is charged to the user, the at least one of the at least two account holders, or a combination thereof.

22. The method of claim 19 wherein the fee is charged to a financial institution affiliated with the at least two different accounts.

23. The method of claim 1, wherein the user comprises a financial intermediary.

* * * * *